US008775782B2

(12) United States Patent
Ichikawa et al.

(10) Patent No.: US 8,775,782 B2
(45) Date of Patent: Jul. 8, 2014

(54) NETWORK SYSTEM, METHOD OF CONTROLLING ACCESS TO STORAGE DEVICE, ADMINISTRATION SERVER, STORAGE DEVICE, LOG-IN CONTROL METHOD, NETWORK BOOT SYSTEM, AND METHOD OF ACCESSING INDIVIDUAL STORAGE UNIT

(75) Inventors: Toshikazu Ichikawa, Tokyo (JP); Junichi Oka, Tokyo (JP); Mitsukazu Washisaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 385 days.

(21) Appl. No.: 12/981,262

(22) Filed: Dec. 29, 2010

(65) Prior Publication Data

US 2011/0099358 A1   Apr. 28, 2011

Related U.S. Application Data

(62) Division of application No. 11/908,247, filed as application No. PCT/JP2006/304802 on Mar. 10, 2006.

(30) Foreign Application Priority Data

Mar. 10, 2005 (JP) ................................. 2005-067041
Mar. 10, 2005 (JP) ................................. 2005-067095
Mar. 10, 2005 (JP) ................................. 2005-067129

(51) Int. Cl.
   *H04L 29/06* (2006.01)
(52) U.S. Cl.
   USPC ..................................... 713/2; 713/1; 726/34
(58) Field of Classification Search
   USPC ............................................................ 713/2
   See application file for complete search history.

(56) References Cited

U.S. PATENT DOCUMENTS

| 6,532,538 | B1 | 3/2003 | Cronk et al. |
| 7,487,343 | B1 * | 2/2009 | Insley et al. ........................ 713/1 |
| 2004/0073677 | A1 * | 4/2004 | Honma et al. ................. 709/226 |
| 2004/0243796 | A1 | 12/2004 | Keohane et al. |

FOREIGN PATENT DOCUMENTS

| EP | 1 126 369 | 8/2001 |
| JP | 2002-007304 | 1/2002 |
| JP | 2002-123400 | 4/2002 |

OTHER PUBLICATIONS

Miei, et al., "R & D Hot Corner Network Storage Centric Network Gijutsu", NTT Gijutsu Journal, vol. 16, No. 5, pp. 44-46, 2004. (with English tranlation).

"To reduce TCO in educational computer environments diskless Windows using VID", IPSJ Magazine, vol. 45, No. 3, 2004. (with partial English translation).

Office Action mailed Dec. 7, 2011, in co-pending U.S. Appl. No. 12/981,334.

U.S. Appl. No. 12/981,300, filed Dec. 29, 2010, Ichikawa, et al.
U.S. Appl. No. 12/981,334, filed Dec. 29, 2010, Ichikawa, et al.

* cited by examiner

*Primary Examiner* — Longbit Chai
(74) *Attorney, Agent, or Firm* — Oblon, Spivak, McClelland, Maier & Neustadt, L.L.P.

(57) ABSTRACT

A network boot system including one or more client terminals, a DHCP (Dynamic Host Configuration Protocol) server, a PXE (Preboot Execution Environment) server, a TFTP (Trivial File Transfer Protocol) server, a database administration server, one or more storage devices, and an authentification server (such as a Radius server) connected to each other via a TCP/IP (Transmission Control Protocol/Internet Protocol) network. A plurality of LU provided in the storage devices as separated into a system area LU and a user area LU prepared per user.

6 Claims, 29 Drawing Sheets

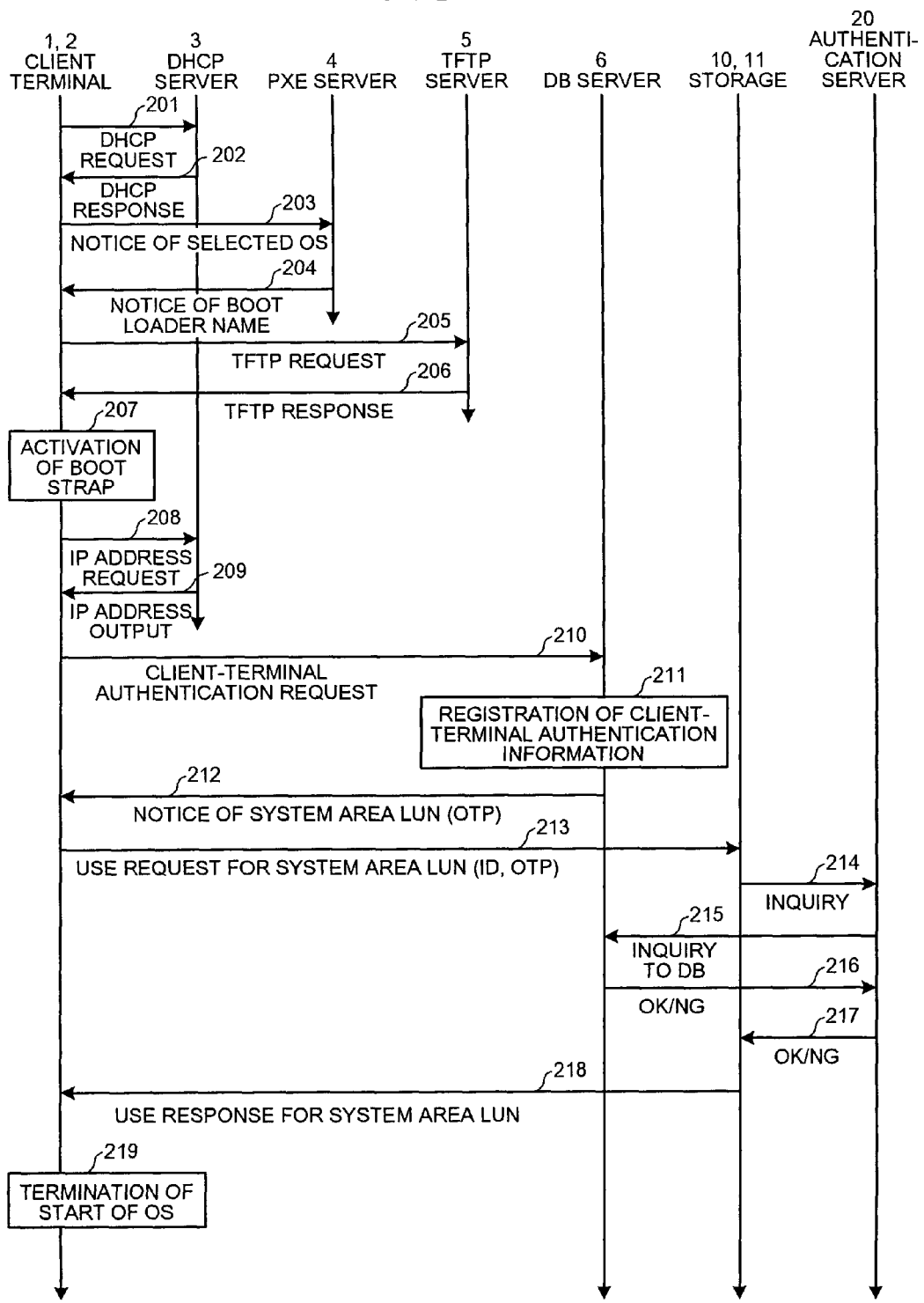

- CLIENT-TERMINAL BOOT-CONTROL TABLE — 61
- USER INFORMATION TABLE — 62
- LUN INFORMATION TABLE — 63
- STORAGE-DEVICE INFORMATION TABLE — 64
- CLIENT-TERMINAL INFORMATION TABLE — 65
- OTP CHECK TABLE — 66

| MAC ADDRESS | IP ADDRESS | OS NAME | USER NAME | LUN |
|---|---|---|---|---|
|  |  |  |  |  |
|  |  |  |  |  |
|  |  |  |  |  |

FIG.1-6

| USER NAME | PASSWORD |
|---|---|
| | |
| | |
| | |

FIG.1-7

| LUN | CATEGORY OF LU | OS OF LU | CLIENT TERMINAL NAME USING LU | NAME OF USER USING LU |
|---|---|---|---|---|
| | | | | |
| | | | | |
| | | | | |

FIG.1-8

| IP ADDRESS | PORT NUMBER | TARGET NAME | LUN |
|---|---|---|---|
| | | | |
| | | | |
| | | | |

FIG.1-9

| MAC ADDRESS | IP ADDRESS (CLIENT TERMINAL) | IP ADDRESS (DHCP SERVER) | IP ADDRESS (TFTP SERVER) |
|---|---|---|---|
| | | | |
| | | | |
| | | | |

FIG.1-10

| USER IDENTIFIER | ONE TIME PASSWORD | LUN |
|---|---|---|
| | | |
| | | |
| | | |

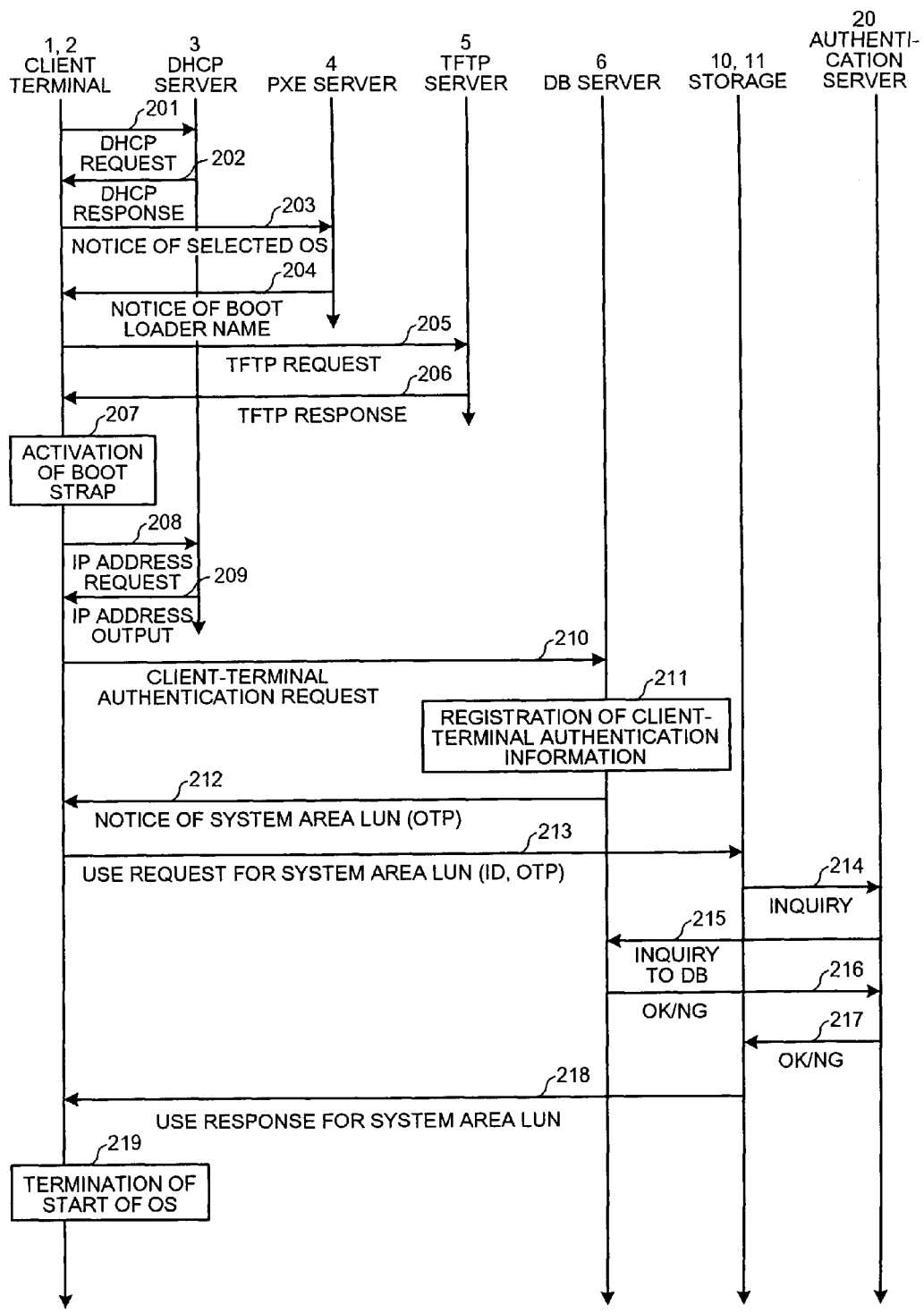

| MAC ADDRESS | IP ADDRESS | OS NAME | USER NAME | LUN | DOUBLE LOG-IN PROCESSING FLAG |
|---|---|---|---|---|---|
|  |  |  |  |  |  |
|  |  |  |  |  |  |
|  |  |  |  |  |  |

FIG.2-8

| USER NAME | PASSWORD |
|---|---|
|  |  |
|  |  |
|  |  |

FIG.2-9

| LUN | CATEGORY OF LU | OS OF LU | CLIENT TERMINAL NAME USING LU | NAME OF USER USING LU |
|---|---|---|---|---|
|  |  |  |  |  |
|  |  |  |  |  |
|  |  |  |  |  |

FIG.2-10

| IP ADDRESS | PORT NUMBER | TARGET NAME | LUN |
|---|---|---|---|
|  |  |  |  |
|  |  |  |  |
|  |  |  |  |

FIG.2-11

| MAC ADDRESS | IP ADDRESS (CLIENT TERMINAL) | IP ADDRESS (DHCP SERVER) | IP ADDRESS (TFTP SERVER) |
|---|---|---|---|
| | | | |
| | | | |
| | | | |

FIG.2-12

| USER IDENTIFIER | ONE TIME PASSWORD | LUN |
|---|---|---|
| | | |
| | | |
| | | |

- 6
- CLIENT-TERMINAL BOOT-CONTROL TABLE — 61
- USER INFORMATION TABLE — 62
- LUN INFORMATION TABLE — 63
- STORAGE-DEVICE INFORMATION TABLE — 64
- CLIENT-TERMINAL INFORMATION TABLE — 65

| MAC ADDRESS | IP ADDRESS | OS NAME | USER NAME | SYSTEM AREA LUN | USER AREA LUN |
|---|---|---|---|---|---|
| | | | | | |
| | | | | | |
| | | | | | |

FIG.3-5

| USER NAME | PASSWORD |
|---|---|
|  |  |
|  |  |
|  |  |

FIG.3-6

| LUN | CATEGORY OF LU | TYPE OF LU | OS OF LU | CLIENT TERMINAL NAME USING LU | NAME OF USER USING LU |
|---|---|---|---|---|---|
|  |  |  |  |  |  |
|  |  |  |  |  |  |
|  |  |  |  |  |  |

FIG.3-7

| IP ADDRESS | PORT NUMBER | TARGET NAME | LUN |
|---|---|---|---|
|  |  |  |  |
|  |  |  |  |
|  |  |  |  |

FIG.3-8

| MAC ADDRESS | IP ADDRESS (CLIENT TERMINAL) | IP ADDRESS (DHCP SERVER) | IP ADDRESS (TFTP SERVER) |
|---|---|---|---|
| | | | |
| | | | |
| | | | |

FIG.3-10

| OS NAME | VERSION IN USE |
|---|---|
| RedHat9 | 20041018 |
| WindowsXP | 20041101 |

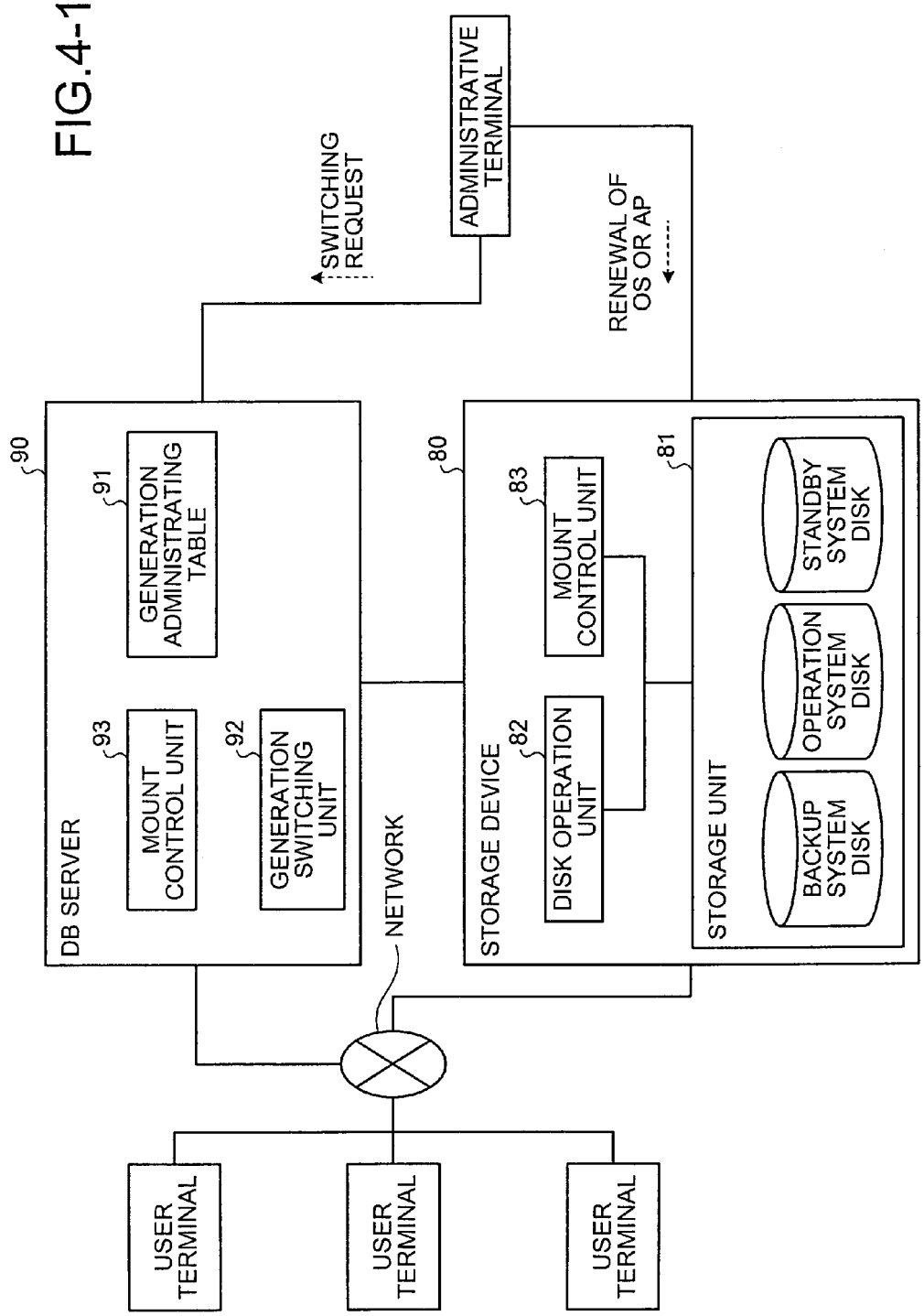

| BACKUP SYSTEM | DISK A |
| OPERATION SYSTEM | DISK B |
| STANDBY SYSTEM | DISK C |

| BACKUP SYSTEM | DISK B |
| OPERATION SYSTEM | DISK D (=COPY (DISK C)) |
| STANDBY SYSTEM | DISK C |

| BACKUP SYSTEM | DISK D |
| OPERATION SYSTEM | DISK E (=COPY (DISK C)) |
| STANDBY SYSTEM | DISK C |

| BACKUP SYSTEM | DISK A |
|---|---|
| OPERATION SYSTEM | DISK B |
| STANDBY SYSTEM | DISK C |

| BACKUP SYSTEM | DISK B |
|---|---|
| OPERATION SYSTEM | DISK A |
| STANDBY SYSTEM | DISK D (=COPY (DISK A)) |

| BACKUP SYSTEM | DISK A |
|---|---|
| OPERATION SYSTEM | DISK B |
| STANDBY SYSTEM | DISK E (=COPY (DISK B)) | ns
NETWORK SYSTEM, METHOD OF CONTROLLING ACCESS TO STORAGE DEVICE, ADMINISTRATION SERVER, STORAGE DEVICE, LOG-IN CONTROL METHOD, NETWORK BOOT SYSTEM, AND METHOD OF ACCESSING INDIVIDUAL STORAGE UNIT

CROSS-REFERENCE TO RELATED APPLICATIONS

The present application is a divisional application of and claims the benefit of priority under 35 U.S.C. §120 from U.S. application Ser. No. 11/908,247, filed Sep. 10, 2007, the entire contents of which is incorporated herein by reference. U.S. application Ser. No. 11/908,247 is a national stage of International Application No. PCT/JP2006/304802, filed Mar. 10, 2006, which is based upon and claims the benefit of priority under 35 U.S.C. §119 from prior Japanese Patent Applications No. 2005-067041, No. 2005-067095 and No. 2005-067129, all filed Mar. 10, 2005.

TECHNICAL FIELD

The present invention relates to a network system, a user authentication method, and a storage device, and particularly relates to a user authentication method by a storage device. Moreover, the present invention relates to a network system, a log-in control method, and an administration server, and particularly relates to a technology for preventing a logical unit from being crushed due to a multiple mount. Furthermore, the present invention relates to a network boot system, and a method of accessing an individual storage unit, and particularly relates to a technology for reducing maintenance costs for a logical unit in a storage device in a network boot system.

BACKGROUND ART

Conventionally, a network boot system has been known in which data needed for operation of a computer terminal, for example, an operating system (hereinafter, OS) and an application software, is stored in a storage device provided outside the computer terminal, and available to be acquired via a network (see Patent Document 1 below).

With the invention according to the Patent Document 1, data needed for a computer terminal can be stored centrally into a storage device without storing the data in a hard disk built-in each computer, so that renewal processing of data in a storage device, such as renewing an OS or an application software to a new version, or combating computer viruses, can be performed by an administrator of the network boot system without depending on a voluntary operation by a user of each computer.

One of conventional art documents related to the present invention is the following.

Patent Document 1: Japanese Patent Application Laid-open No. 2002-123400

DISCLOSURE OF INVENTION

Problem to be Solved by the Invention

However, the above conventional technology has problems as explained below.

The first problem is that: in the above network boot system, a client terminal uses a logical unit (hereinafter, LU) that stores therein an OS, an application program, user data, and the like, in a storage device; when using the LU, authentication is required to prevent an unauthorized access to the storage device; when authentication information (a user ID and a password) for the use of the LU is statically assigned, and if the authentication information is leaked, for example, because the root/Administrator authority of a client terminal is stolen, there is a possibility that an LU may be read and written in a fraudulent manner.

The second problem is that: in the above network boot system, a client terminal uses a logical unit (hereinafter, LU) that stores therein an OS, an application program, user data, and the like, in a storage device; if the same user logs in from a plurality of different client terminal, and if one of LUs for the user is mounted to be available for reading and writing from a plurality of client terminals at the same time, inconsistency/destruction of data in the LU may occur.

The third problem is that: in the above network boot system, a logical unit (hereinafter, LU) that stores therein an OS, an application program, user data, and the like needs to be prepared for each client terminal; suppose the quantity of users is N, the quantity of OSs is M, despite that files constituting an OS are common for the OS, the network boot system requires N times M units of LUs in the storage device, and maintenance (OS update, installation of application program, virus check, backup, and the like) is required for each of the LUs, so that maintenance costs on the administrator is increased.

The present invention has been made to solve the conventional problem, and an object of the present invention is to provide a technology that can prevent an unauthorized access to an individual storage unit in a system for the client terminal to mount the individual storage unit in a storage device connected via a network, to provide a technology that can prevent a crush of an individual storage unit due to a double log-in by the same user ID in the system for the client terminal to mount the individual storage unit in the storage device connected via the network, and furthermore, to provide a technology that can reduce maintenance costs for an individual storage unit in the storage unit in a method of access to the network boot system and an individual storage unit.

The above and other objects and new features of the present invention will be disclosed in the description and the accompanying drawings.

Means for Solving Problem

An overview of representative inventions among inventions disclosed in the present application is briefly explained below.

To achieve the above object, in a network system according to the present invention, an administration server authenticates a client terminal and a user, creates a password for using an individual storage unit for the user, registers the password into an internal database (or, a common database shared with an authentication server), and notifies the client terminal of the password and individual storage unit information (a target name, the number of the individual storage unit, or the like). The client terminal makes a use request for the individual storage unit to the storage device by adding a user identifier (for example, a user ID) and the password. The storage device transmits the user identifier and the password to the administration server directly or via the authentication server (for example, Radius server). Alternatively, the storage device transmits the user identifier and the password to the authentication server. The administration server or the authentication server then checks the user identifier and the password, and the storage device gives an approval for the use of the individual storage unit to the client terminal in accordance with a result of the check obtained by the administration server or the authentication server.

To achieve the above object, in a network system according to the present invention, an administration server authenticates a user, creates a password for using an individual storage unit, stores the password into an internal database (or, a common database shared with an authentication server), and notifies the client terminal of the password and individual storage unit information (a target name, an LUN, or the like). The client terminal makes a use request for the individual storage unit to the storage device by adding information for identifying the user (for example, a user ID) and the password. The storage device confirms whether the password added to the use request for the individual storage unit from the client terminal is the password properly authenticated by the administration server, and then if the password is the password properly authenticated by the administration server, the storage device approves the use request for the individual storage unit form the client terminal. Alternatively, for example, a case is assumed that while a user A has logged in via a first client terminal, a second client terminal makes a user authentication request (a log-in request) for the same user (the user A) to the administration server. If the new log-in client is effective, the administration server creates a new password for the user A to use the individual storage unit, renews the already stored password to the new password, stores the new password into the database, and notifies the second client terminal of individual storage unit information and the renewed password for the user A. By contrast, if the existing log-in client is effective, the administration server does not create new password, not renew the password, and not notify the second client terminal of new password, but disapproves the user authentication request from the second client terminal.

To achieve the object described above, in the network boot system according to the present invention, a plurality of individual storage units provided in a storage device include a system-area individual storage unit (for example, a individual storage unit in which operating system data and application program data are stored). The system area individual storage unit includes a master individual storage unit, a replica individual storage unit copied from the master individual storage unit. When accessing the system-area individual storage unit, the client terminals accesses the replica individual storage unit. When the master individual storage unit is renewed, the storage device creates a replica individual storage unit by copying the renewed master individual storage unit. In addition, the network boot system includes the administration server that includes an LUN information table for administrating master individual storage unit information and replica individual storage unit information. The administration server notifies each of the client terminals of information about the replica individual storage unit accessed by each of the client terminals by referring to the LUN information table. According to the present invention, it is enough to perform maintenance only to the master individual storage unit, so that maintenance costs for individual storage units in a storage device can be reduced.

To achieve the object described above, a storage device for administrating data mounted on a client terminal over a plurality of generations and controlling the data by receiving a mount request from the client terminal includes a generation-based storage unit that stores therein data in a currently operated generation as operation system data, stores therein data stored as an operation system data before a generation switch as backup system data, and stores therein data a generation to be operated next as standby system data; a generation switching unit that switches data in a generation stored as the standby system data to the operation system data in the generation-based storage unit, and switches data in a generation stored as the operation system data to the backup system data; and a mount control unit that mounts the operation system data stored in the generation-based storage unit onto the client terminal when receiving the mount request, and controls mounting by using the backup system data when the generation switching unit switches generations while the operation system data is mounted on the client terminal.

Effect of the Invention

Effects obtained by representative inventions among inventions disclosed in the present application are briefly explained below.

According to the present invention, an unauthorized access to an individual storage unit of which a use is not approved by an administration server can be prevented.

Moreover, according to the present invention, a double-log in by the same user can be prevented, and crush of an individual storage unit caused by a double-log in with the same user ID can be prevented.

Furthermore, maintenance costs for individual units in a storage device can be reduced.

Moreover, according to the present invention, when switching generations to set standby system data to be new operation system data, data in a generation stored as operation system data is switched to be backup system data, and a mount on a client terminal is continued by using the backup system data if the generation of the client terminal is switched while the operation system data is mounted on the client terminal. Consequently, a switching operation to a new generation can be performed without stopping processing performed by the client terminal on which the operation system data is currently mounted.

Furthermore, standby system data is stored separately from operation system data and backup system data, and a use by a client terminal is approved only for the operation system data and the backup system data. Consequently, a renewing operation of the standby system data can be performed without stopping processing performed by the client terminal that is currently using the operation system data and the backup system data.

BRIEF DESCRIPTION OF DRAWINGS

FIG. 1-2 is a sequence diagram for explaining operation of the network boot system according to the first embodiment of the present invention.

FIG. 1-3 is a sequence diagram for explaining operation of the network boot system according to the first embodiment of the present invention.

FIG. 1-4 is a schematic diagram that presents varieties of tables managed within a database administration server shown in FIG. 1-1.

FIG. 1-5 is a schematic diagram that presents contents of a client-terminal boot-control table shown in FIG. 1-4.

FIG. 1-6 is a schematic diagram that presents contents of a user information table shown in FIG. 1-4.

FIG. 1-7 is a schematic diagram that presents contents of an LUN information table shown in FIG. 1-4.

FIG. 1-8 is a schematic diagram that presents contents of a storage-device information table shown in FIG. 1-4.

FIG. 1-9 is a schematic diagram that presents contents of a client-terminal information table shown in FIG. 1-4.

FIG. 1-10 is a schematic diagram that presents contents of an OTP check table shown in FIG. 1-4.

FIG. 1-11 is a schematic diagram for explaining a modification of the network boot system according to the first embodiment of the present invention.

FIG. 1-12 is a schematic diagram for explaining a modification of the network boot system according to the first embodiment of the present invention.

FIG. 2-1 is a block diagram that depicts an overview configuration of a network boot system according to a second embodiment of the present invention.

FIG. 2-2 is a sequence diagram for explaining operation of a network boot system assumed for the present invention.

FIG. 2-3 is a sequence diagram for explaining operation of the network boot system assumed for the present invention.

FIG. 2-4 is a sequence diagram for explaining operation of the network boot system according to the second embodiment of the present invention.

FIG. 2-5 is a sequence diagram for explaining operation of the network boot system according to the second embodiment of the present invention.

FIG. 2-6 is a schematic diagram that presents varieties of tables managed within a database administration server shown in FIG. 2-1.

FIG. 2-7 is a schematic diagram that presents contents of a client-terminal boot-control table shown in FIG. 2-6.

FIG. 2-8 is a schematic diagram that presents contents of a user information table shown in FIG. 2-6.

FIG. 2-9 is a schematic diagram that presents contents of an LUN information table shown in FIG. 2-6.

FIG. 2-10 is a schematic diagram that presents contents of a storage-device information table shown in FIG. 2-6.

FIG. 2-11 is a schematic diagram that presents contents of a client-terminal information table shown in FIG. 2-6.

FIG. 2-12 is a schematic diagram that presents contents of an OTP check table shown in FIG. 2-6.

FIG. 2-13 is a schematic diagram for explaining a modification of the network boot system according to the embodiments of the present invention.

FIG. 2-14 is a schematic diagram for explaining a modification of the network boot system according to the embodiments of the present invention.

FIG. 3-1 is a block diagram that depicts an overview configuration of a network boot system according to a third embodiment of the present invention.

FIG. 3-2 is a sequence diagram for explaining operation of the network boot system according to the third embodiment of the present invention.

FIG. 3-3 is a schematic diagram that presents varieties of tables managed within a database administration server shown in FIG. 3-1.

FIG. 3-4 is a schematic diagram that presents contents of a client-terminal boot-control table shown in FIG. 3-3.

FIG. 3-5 is a schematic diagram that presents contents of a user information table shown in FIG. 3-3.

FIG. 3-6 is a schematic diagram that presents contents of an LUN information table shown in FIG. 3-3.

FIG. 3-7 is a schematic diagram that presents contents of a storage-device information table shown in FIG. 3-3.

FIG. 3-8 is a schematic diagram that presents contents of a client-terminal information table shown in FIG. 3-3.

FIG. 3-9 is a schematic diagram for explaining features of the third embodiment according to the present invention.

FIG. 3-10 is a schematic diagram that presents a configuration example of information for administrating a master LU according to the third embodiment.

FIG. 4-1 is a schematic diagram that depicts a configuration of a storage device according to a fourth embodiment.

FIG. 4-2 is a schematic diagram that depicts transitions of real volumes corresponding to respective disk information in a generation administrating table by a system switching-back operation of a storage system according to the fourth embodiment.

FIG. 4-3 is a schematic diagram that presents a configuration example of the generation administrating table according to the fourth embodiment.

FIG. 4-5 is a schematic diagram that presents a configuration example of the generation administrating table according to the fourth embodiment.

FIG. 4-6 is a schematic diagram that depicts a modification of a network boot system configuration.

FIG. 4-7 is a schematic diagram that depicts a modification of the network boot system configuration.

EXPLANATIONS OF LETTERS OR NUMERALS

Figure 1:
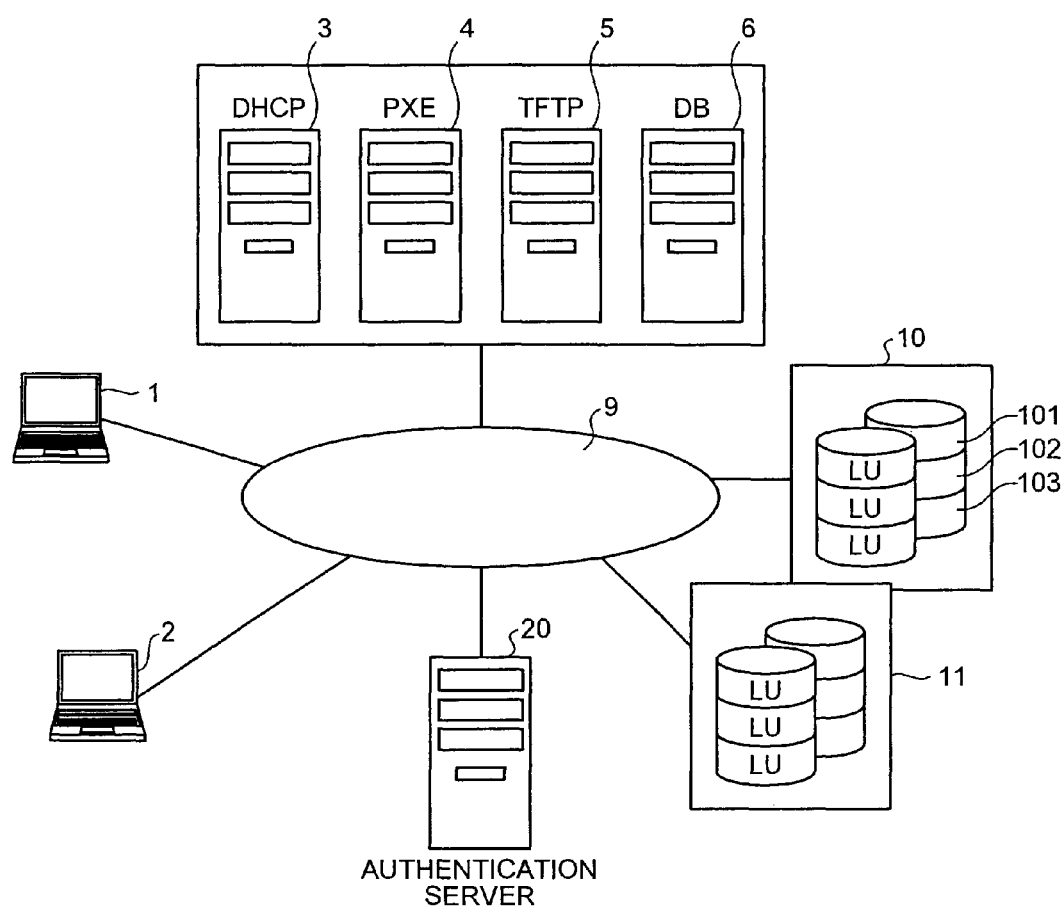
FIG. 1-1 is a block diagram that depicts an overview configuration of a network boot system according to a first embodiment of the present invention.

1, 2 Client terminal
3 DHCP (Dynamic Host Configuration Protocol) server
4 PXE (Preboot Execution Environment) server
5 TFTP (Trivial File Transfer Protocol) server
6 Database administration server
9 TCP/IP network
10, 11 Storage device
20 Authentication server (Radius server)
30 Common database
61 Client-terminal boot-control table
62 User information table
63 LUN information table
64 Storage-device information table
65 Client-terminal information table
66 OTP check table
70 Administrative terminal
80 Storage device
90 DB server
101 to 103 Target

BEST MODE(S) FOR CARRYING OUT THE INVENTION

Exemplary embodiments in which the present invention is applied to a network boot system are explained below in detail with reference to the drawings. In all of the drawings for explaining the embodiments, elements having the same function are assigned with the same reference numeral, and repetition of the explanation of the element is omitted.

First Embodiment

FIG. 1-1 is a block diagram that depicts an overview configuration of a network boot system according to a first embodiment of the present invention.

In the network boot system according to the first embodiment, as shown in FIG. 1-1, one or more client terminals (1, 2), a DHCP (Dynamic Host Configuration Protocol) server 3, a PXE (Preboot Execution Environment) server 4, a TFTP (Trivial File Transfer Protocol) server 5, a database administration server (hereinafter, DB server) 6, one or more storage devices (10, 11), and an authentication server (such as a Radius server) 20 are connected to each other via a TCP/IP (Transmission Control Protocol/Internet Protocol) network 9.

Each of the devices is assigned with an IP address, and the devices can communicate with each other in accordance with TCP/IP.

Each of the storage devices (10, 11) includes one or more targets (101 to 103) for storing therein data, and each of the targets includes one or more logical units (hereinafter, LU). Each of the logical units is assigned with a user (an LU can be assigned with a plurality of users, or no user), and stores therein data (for example, OS and application software) required for the user to operate a client terminal.

In the first embodiment, it is assumed to use iSCSI (Internet Small Computer System Interface) as a communication protocol between each of the client terminals (1, 2) and each of the storage devices (10, 11). However, the communication protocol is not limited to iSCSI as long as the protocol is an IP storage-device access-protocol that can be transferred based on TCP/IP. Instead of connecting the storage devices (10, 11) to the TCP/IP network 9, a storage router can be connected.

The storage router is connected to a storage device that has a communication function in accordance with a storage-device access-protocol other than iSCSI, such as fiber channel (hereinafter, FC) via a network different from the TCP/IP network 9, converts the protocols between iSCSI and FC or another protocol, and relays communication between each of the client terminals (1, 2) and each of the storage devices.

In FIG. 1-1, all or part of the storage devices (10, 11) can be replaced with the storage router, and the system still operate without problem. However, in the following explanation, a case without storage router is explained.

In the network boot system according to the first embodiment, a plurality of LUs provided in the storage devices (10, 11) are separated into a system area LU and user area LUs, each of which is provided for each user. The system area LU stores therein OS, application data, and the like. The user area LU stores therein user data (for example, desk-top setting data, a document file, and the like).

Operation of the network boot system according to the first embodiment is explained below with reference to a sequence diagram shown in FIGS. 1-2 and 1-3.

Figures 1, 2, 3:
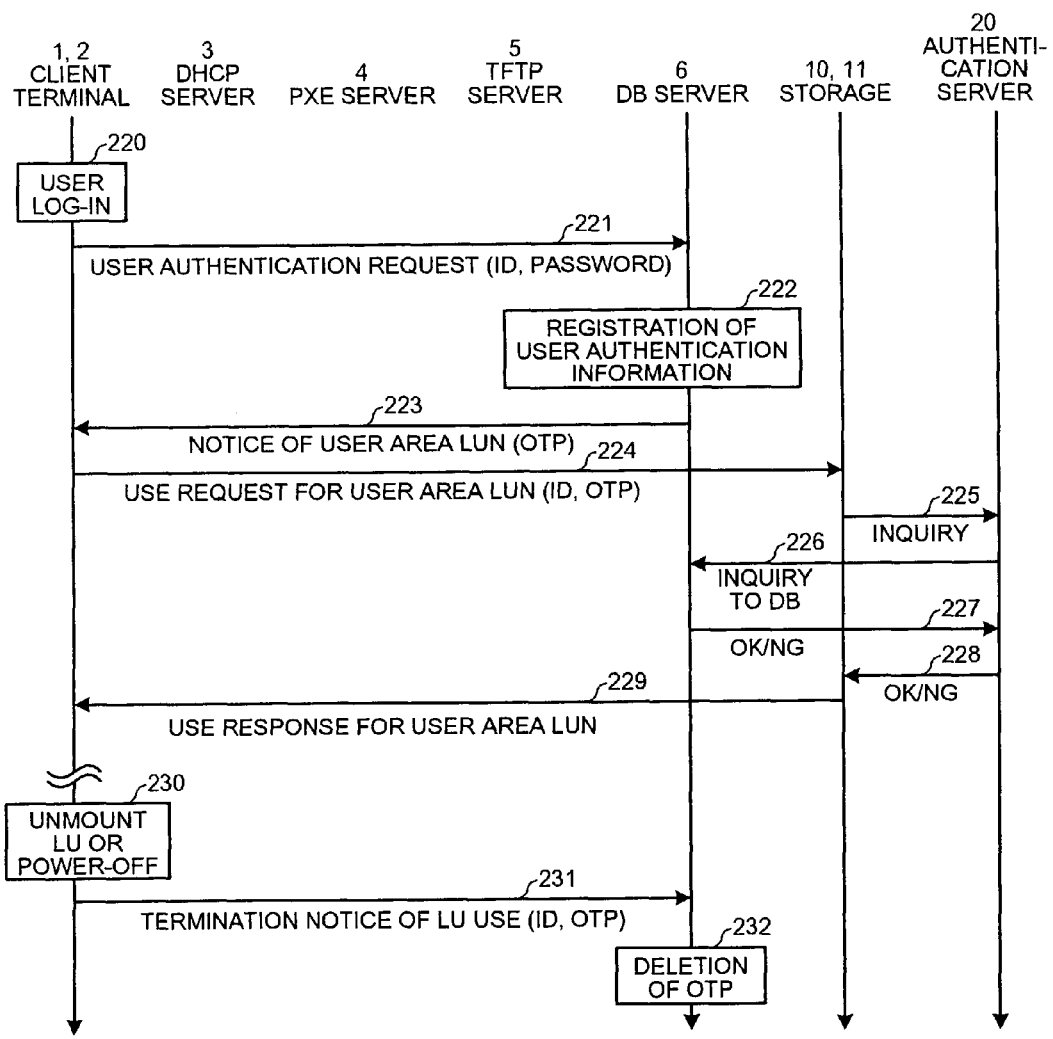

When the power is turned on, each of the client terminals (1, 2) transmits a DHCP request to the DHCP server 3 (201 in FIG. 1-2), and the DHCP server 3 replies a DHCP response to each of the client terminals (1, 2) (202 in FIG. 1-2).

By receiving the DHCP response, each of the client terminals (1, 2) obtains an IP address for the TCP/IP network 9. Furthermore, the DHCP response includes an IP address of the PXE server 4, and a command for displaying a menu screen for a user to select an OS.

The client terminals (1, 2) then execute the command for displaying the menu screen for a user to select an OS, and notify the PXE server 4 of the OS selected by the user (203 in FIG. 1-2). The PXE server 4 notifies the client terminals (1, 2) of an IP address of the TFTP server 5 and a boot-strap file identifier (204 in FIG. 1-2).

The client terminals (1, 2) then transmit an acquisition request for a boot strap file (a TFTP request) to the specified TFTP server 5 (205 in FIG. 1-2), and download a boot strap file corresponding to the notified boot-strap file identifier from the TFTP server 5 (206 in FIG. 1-2).

The client terminals (1, 2) then expand and execute the downloaded boot strap file on a RAM (Random Access Memory) in each of the client terminals (1, 2) (207 in FIG. 1-2).

The boot strap file in each of the client terminals (1, 2) transmits an IP address request to the DHCP server 3 (208 in FIG. 1-2). The DHCP server 3 notifies each of the client terminals (1, 2) of an IP address (209 in FIG. 1-2).

The client terminals (1, 2) then transmit a client-terminal authentication request to the DB server 6 (210 in FIG. 1-2).

The DB server 6 authenticates the client terminals (1, 2), and registers client terminal information into an internal database (211 in FIG. 1-2). At the same time, the DB server 6 creates a one-time password (hereinafter, OTP) for using a system area LU, and stores the OTP, a client terminal name, and an LUN (Logical Unit Number), into the internal database (an OTP check table, which will be described later) in an associated manner.

The DB server 6 then notifies the client terminals (1, 2) of the OTP and a logical unit number (hereinafter, LUN) of the system area (212 in FIG. 1-2). At the same time, the DB server 6 notifies the client terminals (1, 2) of an IP address, a port number, and a target name, of a storage device that stores therein the LU defined by the notified number.

The client terminals (1, 2) issue a use request for a system area LU defined by the notified LUN to the storage devices (10, 11) by adding the OTP and a user identifier (for example, a client terminal name) (213 in FIG. 1-2).

The storage devices (10, 11) notify the authentication server 20 of the user identifier and the OTP added to the use request for the LU based on the use request for the system area LU from the client terminals (1, 2) (214 in FIG. 1-2).

The authentication server 20 notifies the DB server 6 of the user identifier and the OTP both of which are notified from the storage devices (10, 11) (215 in FIG. 1-2).

The DB server 6 compares the OTP notified from the authentication server 20 to the OTP of a client terminal corresponding to the user identifier notified from the authentication server 20 from among OTPs stored in the internal database, checks whether the OTP and the client terminal corresponding to the user identifier notified from the authentication server 20 is the OTP and the client terminal properly authenticated by the DB server 6, and notifies the authentication server 20 of a result of the check (216 in FIG. 1-2).

The authentication server 20 notifies the storage devices (10, 11) of the check result (217 in FIG. 1-2).

The storage devices (10, 11) determine whether to or not to approve the use request for the system area LU from the client terminals (1, 2) in accordance with the check result, and notify the client terminals (1, 2) (218 in FIG. 1-2).

If the use request for the system area LU from the client terminals (1, 2) is approved by the storage devices (10, 11), the client terminals (1, 2) mount and boot the system area LU defined by the notified LUN. By the operation, the start of the OS is finished (219 in FIG. 1-2).

Waiting log in by a user (220 in FIG. 1-3) in the next step, the OS of the client terminals (1, 2) transmits a user authentication request to the DB server 6 (221 in FIG. 1-3). At the moment, the client terminals (1, 2) notify the DB server 6 of a user ID and a password.

The DB server 6 confirms authenticity of the user, and registers user information into the internal database (222 in FIG. 1-3). At the same time, the DB server 6 creates a one-time password (hereinafter, OTP) for using a user area LU, and stores the OTP, a user name, and an LUN (Logical Unit Number), into the internal database (an OTP check table, which will be described later) in an associated manner.

The DB server 6 then notifies the client terminals (1, 2) of a logical unit number (hereinafter, LUN) of a user area and the OTP (223 in FIG. 1-3). At the same time, the DB server 6 notifies the client terminals (1, 2) of an IP address, a port number, and a target name, of a storage device that stores therein the LU defined by the notified number.

The client terminals (1, 2) issue a use request for a user area LU defined by the notified LUN to the storage devices (10, 11) by adding the OTP and a user identifier (for example, a user ID) (224 in FIG. 1-3).

The storage devices (10, 11) notify the authentication server 20 of the user identifier and the OTP added to the use request for the LU based on the use request for the user area LU from the client terminals (1, 2) (225 in FIG. 1-3).

The authentication server 20 notifies the DB server 6 of the user identifier and the OTP both of which are notified from the storage devices (10, 11) (226 in FIG. 1-3).

The DB server 6 compares the OTP notified from the authentication server 20 to the OTP of a user corresponding to the user identifier notified from the authentication server 20 from among OTPs stored in the internal database, checks whether the OTP and the user corresponding to the user identifier notified from the authentication server 20 is the OTP and the user properly authenticated by the DB server 6, and notifies the authentication server 20 of a result of the check (227 in FIG. 1-3).

The authentication server 20 notifies the storage devices (10, 11) of the check result (228 in FIG. 1-3).

The storage devices (10, 11) determine whether to or not to approve the use request for the user area LU from the client terminals (1, 2) in accordance with the check result, and notify the client terminals (1, 2) (229 in FIG. 1-3).

If the use request for the user area LU from the client terminals (1, 2) is approved by the storage devices (10, 11), the client terminals (1, 2) mount the user area LU defined by the notified LUN.

When the user unmounts the user area LU, or the power of the client terminal is turned off (230 in FIG. 1-3), the client terminals (1, 2) notify the DB server 6 of termination of the use of the LU (231 in FIG. 1-3). At the moment, the OS of the client terminals (1, 2) notifies the DB server 6 of the user ID and the OTP.

The DB server 6 deletes the corresponding user and the OTP for the user in the internal database (OTP check table, which will be described later) (232 in FIG. 1-3) based on the use termination notice.

In the explanation described above, as shown in FIG. 1-12, the case is explained where the storage devices (10, 11) notify the authentication server 20 of the user identifier and the OTP, and the authentication server 20 notifies the DB server 6 of the notified user identifier and the OTP. However, the storage devices (10, 11) can directly notify the DB server 6 without notification via the authentication server 20.

Alternatively, as shown in FIG. 1-11, it can be configured such that: the DB server 6 and the authentication server 20 share a database 30; the DB server 6 registers a user identifier and an OTP into the database 30; the authentication server 20 compares an OTP notified by the storage devices (10, 11) and an OTP for a user corresponding to a user identifier notified by the storage devices (10, 11) from among OTPs stored in the database 30, checks whether the OTP and a client terminal (or a user) corresponding to the user identifier notified by the storage devices (10, 11) are properly authenticated by the DB server 6, and notifies the storage devices (10, 11) of a result of the check.

FIG. 1-4 is a schematic diagram that presents varieties of tables managed within the DB server 6 shown in FIG. 1-1.

As shown in FIG. 1-4, in the DB server 6, a client-terminal boot-control table 61, a user information table 62, an LUN information table 63, a storage-device information table 64, a client-terminal information table 65, and an OTP check table 66 are provided.

FIG. 1-5 is a schematic diagram that presents contents of the client-terminal boot-control table 61 shown in FIG. 1-4.

As shown in FIG. 1-5, the client-terminal boot-control table 61 stores therein a MAC address, an IP address, a name of OS in use, an operating user name, a system area LUN, and a user area LUN of a booted client terminal. Each field in the client-terminal boot-control table 61 stores therein certain information when registering client terminal information or user authentication information (211 in FIG. 1-2 or 222 in FIG. 1-3).

FIG. 1-6 is a schematic diagram that presents contents of the user information table 62 shown in FIG. 1-4. As shown in FIG. 1-6, the user information table 62 stores therein a password of each user name. The user information table 62 is used at user authentication (222 in FIG. 1-3).

FIG. 1-7 is a schematic diagram that presents contents of the LUN information table 63 shown in FIG. 1-4. As shown in FIG. 1-7, the LUN information table 63 stores therein an LUN, a category of an LU defined by the number of the LUN (a system area LU, or a user area LU), an OS of the LU defined by the number of the LUN, a name of a client terminal in use, and an operating user name. Only when the "category of LU" is the system area LU, a client terminal identifier is stored in the "client terminal using LU", and only when the "category of LU" is the user area LU, a user name is stored in the "name of user using LU". Using the LUN information table 63, the client terminal is notified of the system area LUN and the user area LUN (212 in FIGS. 1-2 and 223 in FIG. 1-3).

FIG. 1-8 is a schematic diagram that presents contents of the storage-device information table 64 shown in FIG. 1-4. As shown in FIG. 1-8, the storage-device information table 64 stores therein an IP address, a port number, and a target name of a storage device with respect to each LUN. When notifying the client terminal of the system area LUN and the user area LUN (212 in FIGS. 1-2 and 223 in FIG. 1-3), also contents of the storage-device information table 64 are simultaneously notified.

FIG. 1-9 is a schematic diagram that presents contents of the client-terminal information table 65 shown in FIG. 1-4. As shown in FIG. 1-9, the client-terminal information table 65 stores therein a MAC address of a client terminal, an IP address of the client terminal, an IP address of the DHCP server 3, and an IP address of the TFTP server 5.

FIG. 1-10 is a schematic diagram that presents contents of the OTP check table 66 shown in FIG. 1-4. As shown in FIG. 1-10, the OTP check table 66 stores therein a user identifier and a one-time password, and an LUN. When the LUN is the system area LU, for example, a "client terminal name" is stored in the "user identifier", and when the LUN is the user area LU, for example, a "user ID" is stored in the "user identifier"). Each field in the OTP check table 66 stores therein certain information when registering client terminal information or user authentication information (211 in FIGS. 1-2 and 222 in FIG. 1-3).

According to the first embodiment, a boot strap file has a user authentication function and an iSCSI initiator function. The user authentication function is to cause a user of the client terminals (1, 2) to input a user name and a password as required, and to transmit an authentication request to the DB server 6. The iSCSI initiator function is to connect the client terminals (1, 2) to the LUs (101 to 103) in a specified storage device based on a received authentication response.

Moreover, according to the first embodiment, the DB server 6 has a client-terminal authentication program for allocating client-terminal administration data to the client terminals (1, 2) by communicating with the client terminals after the client terminals (1, 2) are powered on.

The program is a program to allocate a boot-up OS, an IP address, a host name (a computer name), a domain name, and a system area LU dynamically based on user selection or MAC address information of the client terminals (1, 2).

Furthermore, the DB server 6 has a user authentication program to allocate user authentication information (a program to allocate a user area LU based on the user name) by communicating with the client terminals (1, 2) at the time of a user log in.

As described above, in the network boot system according to the first embodiment, the DB server (corresponding to the administration server according to the present invention) authenticates a client terminal and a user, creates an OTP (password) for using a system area LU and an OTP for using a user area LU, registers authentication information that includes the OTPs into a database (particularly, the OTP check table), and furthermore, outputs the OTPs and LU information (a target name, an LUN, and the like) to the client terminal.

The client terminal makes a use request for the user area LU to a storage device (or a storage router) by using user identifiers (for example, a client terminal and a user ID) and the OTPs.

The storage device transmits the user identifiers and the OTPs to the DB server directly or via an authentication server, checks whether the user identifiers and the OTPs are properly authenticated by the DB server (or the authentication server), and gives an approval for the use of the LU to the client terminal or the user in accordance with a result of the check.

The DB server deletes the authentication information for using the LU from the database when the use of the LU is finished (for example, when the LU is unmounted, or the client terminal is powered off). Accordingly, an unauthorized access to an LU for which a use approval is not obtained from the DB server can be prevented in the first embodiment.

In the conventional system, there is the problem that the DB server cannot detect an unauthorized use of correct authentication information. However, in the embodiment, even if a third parson obtains an OTP, when an authorized user finishes the use of the LU, the authentication server 20 or the DB server execute processing of double-log in prevention, or the OTP in the OTP check table is deleted after the authorized user finishes the use of the LU, so that the authentication server replies a rejection, thereby enabling the system to prevent an unauthorized use.

In the conventional system, a storage device (or a storage router) needs to keep and administrate an access control list (ACL). However, in the embodiment, the storage device (or the storage router) does not need to have the access control list (ACL), so that the DB server can centralize administration of authentication information.

Although in the above explanation the embodiment is explained in the case where the present invention is applied to a network boot system, the present invention is not limited to this. It is needless to say that present invention can be applied to a network system in which a client terminal accesses a file in an LU in a storage device via a network.

The invention made by the present inventor has been specifically explained by referring to the first embodiment. However, the present invention is not limited to the first embodiment, but it is quite natural that the present invention can be modified in various manners within a scope not departing from the concept of the present invention.

Second Embodiment

FIG. 2-1 is a block diagram that depicts an overview configuration of a network boot system according to a second embodiment of the present invention.

In the network boot system according to the second embodiment, as shown in FIG. 2-1, one or more of the client terminals (1, 2), the DHCP (Dynamic Host Configuration Protocol) server 3, the PXE (Preboot Execution Environment) server 4, the TFTP (Trivial File Transfer Protocol) server 5, the database administration server (hereinafter, DB server) 6, one or more of the storage devices (10, 11), and the authentication server (such as a Radius server) 20 are connected to each other via the TCP/IP (Transmission Control Protocol/Internet Protocol) network 9.

Each of the devices is assigned with an IP address, and the devices can communicate with each other in accordance with TCP/IP.

Each of the storage devices (10, 11) includes one or more of the targets (101 to 103) for storing therein data, and each of the targets includes one or more logical units (hereinafter, LU). Each of the logical units is assigned with a user (an LU can be assigned with a plurality of users, or no user), and stores therein data (for example, OS and application software) required for the user to operate a client terminal.

In the second embodiment, it is assumed to use iSCSI (Internet Small Computer System Interface) as a communication protocol between each of the client terminals (1, 2) and each of the storage devices (10, 11). However, the communication protocol is not limited to iSCSI as long as the protocol is an IP storage-device access-protocol that can be transferred based on TCP/IP.

Instead of connecting the storage devices (10, 11) to the TCP/IP network 9, a storage router can be connected.

The storage router is connected to a storage device that has a communication function in accordance with a storage-device access-protocol other than iSCSI, such as fiber channel (hereinafter, FC) via a network different from the TCP/IP network 9, converts the protocols between iSCSI and FC or another protocol, and relays communication between each of the client terminals (1, 2) and each of the storage devices.

In FIG. 2-1, all or part of the storage devices (10, 11) can be replaced with the storage router, and the system still operate without problem. However, in the following explanation, a case without storage router is explained.

In the network boot system according to the second embodiment, a plurality of LUs provided in the storage devices (10, 11) are separated into a system area LU and user area LUs, each of which is provided for each user. The system area LU stores therein OS, application data, and the like. The user area LU stores therein user data (for example, desk-top setting data, a document file, and the like).

Operation of the network boot system according to the second embodiment is explained below with reference to a sequence diagram shown in FIGS. 2-2 and 2-3.

When the power is turned on, each of the client terminals (1, 2) transmits a DHCP request to the DHCP server 3 (201 in FIG. 2-2), and the DHCP server 3 replies a DHCP response to each of the client terminals (1, 2) (202 in FIG. 2-2).

By receiving the DHCP response, each of the client terminals (1, 2) obtains an IP address for the TCP/IP network 9. Furthermore, the DHCP response includes an IP address of the PXE server 4, and a command for displaying a menu screen for a user to select an OS.

The client terminals (1, 2) then execute the command for displaying the menu screen for a user to select an OS, and notify the PXE server 4 of the OS selected by the user (203 in FIG. 2-2). The PXE server 4 notifies the client terminals (1, 2) of an IP address of the TFTP server 5 and a boot-strap file identifier (204 in FIG. 2-2).

The client terminals (1, 2) then transmit an acquisition request for a boot strap file (a TFTP request) to the specified TFTP server 5 (205 in FIG. 2-2), and download a boot strap file corresponding to the notified boot-strap file identifier from the TFTP server 5 (206 in FIG. 2-2).

The client terminals (1, 2) then expand and execute the downloaded boot strap file on a RAM (Random Access Memory) in each of the client terminals (1, 2) (207 in FIG. 2-2).

The boot strap file in each of the client terminals (1, 2) transmits an IP address request to the DHCP server 3 (208 in FIG. 2-2). The DHCP server 3 notifies each of the client terminals (1, 2) of an IP address (209 in FIG. 2-2).

The client terminals (1, 2) then transmit a client-terminal authentication request to the DB server 6 (210 in FIG. 2-2).

The DB server 6 authenticates the client terminals (1, 2), and registers client terminal information into an internal database (211 in FIG. 2-2). At the same time, the DB server 6 creates a one-time password (hereinafter, OTP) for using a system area LU, and stores the OTP, a client terminal name, and an LUN (Logical Unit Number), into the internal database (an OTP check table, which will be described later) in an associated manner.

The DB server 6 then notifies the client terminals (1, 2) of the OTP and a logical unit number (hereinafter, LUN) of the system area (212 in FIG. 2-2). At the same time, the DB server 6 notifies the client terminals (1, 2) of an IP address, a port number, and a target name, of a storage device that stores therein the LU defined by the notified number.

The client terminals (1, 2) issue a use request for a system area LU defined by the notified LUN to the storage devices (10, 11) by adding the OTP and a user identifier (for example, a client terminal name) (213 in FIG. 2-2).

The storage devices (10, 11) notify the authentication server 20 of the user identifier and the OTP added to the use request for the LU based on the use request for the system area LU from the client terminals (1, 2) (214 in FIG. 2-2).

The authentication server 20 notifies the DB server 6 of the user identifier and the OTP both of which are notified from the storage devices (10, 11) (215 in FIG. 2-2).

The DB server 6 compares the OTP notified from the authentication server 20 to the OTP of a client terminal corresponding to the user identifier notified from the authentication server 20 from among OTPs stored in the internal database, checks whether the OTP and the client terminal corresponding to the user identifier notified from the authentication server 20 is the OTP and the client terminal properly authenticated by the DB server 6, and notifies the authentication server 20 of a result of the check (216 in FIG. 2-2).

The authentication server 20 notifies the storage devices (10, 11) of the check result (217 in FIG. 2-2).

The storage devices (10, 11) determine whether to or not to approve the use request for the system area LU from the client terminals (1, 2) in accordance with the check result, and notify the client terminals (1, 2) (218 in FIG. 2-2).

If the use request for the system area LU from the client terminals (1, 2) is approved by the storage devices (10, 11), the client terminals (1, 2) mount and boot the system area LU defined by the notified LUN. By the operation, the start of the OS is finished (219 in FIG. 2-2).

Waiting log in by a user (220 in FIG. 2-3) in the next step, the OS of the client terminals (1, 2) transmits a user authentication request to the DB server 6 (221 in FIG. 2-3). At the moment, the client terminals (1, 2) notify the DB server 6 of a user ID and a password.

The DB server 6 confirms authenticity of the user, and registers user information into the internal database (222 in FIG. 2-3). At the same time, the DB server 6 creates a one-time password (hereinafter, OTP) for using a user area LU, and stores the OTP, a user name, and an LUN (Logical Unit Number), into the internal database (an OTP check table, which will be described later) in an associated manner.

The DB server 6 then notifies the client terminals (1, 2) of a logical unit number (hereinafter, LUN) of a user area and the OTP (223 in FIG. 2-3). At the same time, the DB server 6 notifies the client terminals (1, 2) of an IP address, a port number, and a target name, of a storage device that stores therein the LU defined by the notified number.

The client terminals (1, 2) issue a use request for a user area LU defined by the notified LUN to the storage devices (10, 11) by adding the OTP and a user identifier (for example, a user ID) (224 in FIG. 2-3).

The storage devices (10, 11) notify the authentication server 20 of the user identifier and the OTP added to the use request for the LU based on the use request for the user area LU from the client terminals (1, 2) (225 in FIG. 2-3).

The authentication server 20 notifies the DB server 6 of the user identifier and the OTP both of which are notified from the storage devices (10, 11) (226 in FIG. 2-3).

The DB server 6 compares the OTP notified from the authentication server 20 to the OTP of a user corresponding to the user identifier notified from the authentication server 20 from among OTPs stored in the internal database, checks whether the OTP and the user corresponding to the user identifier notified from the authentication server 20 is the OTP and the user properly authenticated by the DB server 6, and notifies the authentication server 20 of a result of the check (227 in FIG. 2-3).

The authentication server 20 notifies the storage devices (10, 11) of the check result (228 in FIG. 2-3).

The storage devices (10, 11) determine whether to or not to approve the use request for the user area LU from the client terminals (1, 2) in accordance with the check result, and notify the client terminals (1, 2) (229 in FIG. 2-3).

If the use request for the user area LU from the client terminals (1, 2) is approved by the storage devices (10, 11), the client terminals (1, 2) mount the user area LU defined by the notified LUN.

When the user unmounts the user area LU, or the power of the client terminal is turned off (230 in FIG. 2-3), the client terminals (1, 2) notify the DB server 6 of termination of the use of the LU (231 in FIG. 2-3). At the moment, the OS of the client terminals (1, 2) notifies the DB server 6 of the user ID and the OTP.

The DB server 6 deletes the corresponding user and the OTP for the user in the internal database (OTP check table, which will be described later) (232 in FIG. 2-3) based on the use termination notice.

In the explanation described above, as shown in FIG. 2-14, the case is explained where the storage devices (10, 11) notify the authentication server 20 of the user identifier and the OTP, and the authentication server 20 notifies the DB server 6 of the notified user identifier and the OTP. However, the storage devices (10, 11) can directly notify the DB server 6 without notification via the authentication server 20.

Alternatively, as shown in FIG. 2-13, it can be configured such that: the DB server 6 and the authentication server 20 share the database 30; the DB server 6 registers a user identifier and an OTP into the database 30; the authentication server 20 compares an OTP notified by the storage devices (10, 11) and an OTP for a user corresponding to a user identifier notified by the storage devices (10, 11) from among OTPs stored in the database 30, checks whether the OTP and a client terminal (or a user) corresponding to the user identifier notified by the storage devices (10, 11) are properly authenticated by the DB server 6, and notifies the storage devices (10, 11) of a result of the check.

Log-in control according to the embodiment is explained below with reference to FIGS. 2-4 and 2-5.

Figures 1, 2, 3, 4, 5:
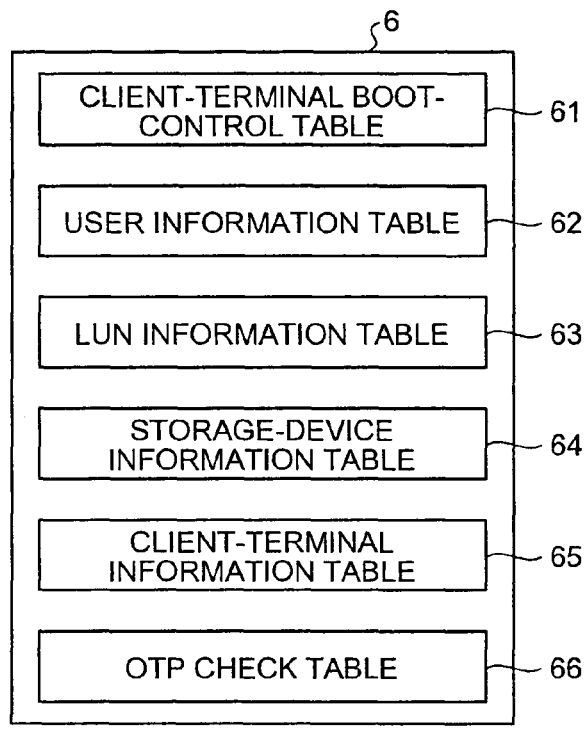

In FIGS. 2-4 and 2-5, it is assumed that a user A logs in via a client terminal A through a procedure from 301 to 311 in FIG. 2-4, and then the user A logs in via a client terminal B.

In this case, there are two processing methods: (1) the new log in by the user A via the client terminal B is activated; and (2) the existing log in by the user A via the client terminal A is activated.

First of all, a case where the new log in by the user A via the client terminal B is activated is explained below. A procedure from 301 to 310 in FIG. 2-4 is the same as the procedure from 220 to 229 in FIG. 2-3, therefore a repeat explanation is omitted.

When the user A logs in (311 in FIG. 2-4), the client terminal B transmits a user authentication request to the DB server 6 (312 in FIG. 2-4). At the moment, the client terminal B notifies the DB server 6 of a user ID and a password of the user A.

The DB server 6 confirms that the user A has logged in via the client terminal A by referring to its internal database, then creates a new OTP for using the user area LU of the user A, renews an OTP already stored in the internal database (an OTP check table, which will be described later) to the new password, and stores the OTP, a user name, an LUN (Logical Unit Number) into the internal database (an OTP check table, which will be described later) in an associated manner (313 in FIG. 2-4).

At the same time, the DB server 6 issues a log-off request for the user A to the client terminal A (314 in FIG. 2-4), and forcefully logs off the log in by the user A via the client terminal A.

Waiting a response from the client terminal A (corresponding to the log off request for the user A; 315 in FIG. 2-4), the DB server 6 then notifies the client terminal B of the LUN (Logical Unit Number) of the user area LU of the user A, and the OTP (316 in FIG. 2-4). At the same time, an IP address, a port number, and a target name of a storage device that stores therein the LU defined by the notified LUN are notified.

Alternatively, without waiting the response from the client terminal A, the DB server 6 can notify the client terminal B of the LUN (Logical Unit Number) of the user area LU of the user A, and the OTP.

The client terminal B then issues a use request for the LU defined by the notified LUN to the storage devices (10, 11) by adding the OTP and a user identifier (for example, the user ID) (317 in FIG. 2-4).

Based on a procedure from 318 to 322 in FIG. 2-4, the storage devices (10, 11) determine whether to or not to approve the use request for the LU from the client terminal B in accordance with an authentication result by the DB server 6, and notifies the client terminal B.

The procedure from 318 to 322 in FIG. 2-4 is the same as the procedure from 225 to 229 in FIG. 2-3, therefore a repeat explanation is omitted.

According to the second embodiment, when the log off request at 314 in FIG. 2-4 reaches timeout, or when the log off request is not received due to a network interruption; even if the client terminal A accesses the storage devices (10, 11), the OTP notified by the client terminal A differs from the OTP stored in the internal database of the DB server 6, so that the OTPs are inconsistent with each other according to the check by the DB server 6, and the user request for the LU from the client terminal A is not approved.

Next, a case where the existing log in by the user A via the client terminal A is activated is explained below.

When the user A logs in (411 in FIG. 2-5), the client terminal B transmits a user authentication request to the DB server 6 (412 in FIG. 2-5).

The DB server 6 refers to the internal database, and confirms that the user A has logged in via the client terminal A, (413 in FIG. 2-5), and then disapproves the log in via the client terminal B (414 in FIG. 2-5).

FIG. 2-6 is a schematic diagram that presents varieties of tables managed within the DB server 6 shown in FIG. 2-1.

As shown in FIG. 2-6, in the DB server 6, the client-terminal boot-control table 61, the user information table 62, the LUN information table 63, the storage-device information table 64, the client-terminal information table 65, and the OTP check table 66 are provided.

FIG. 2-7 is a schematic diagram that presents contents of the client-terminal boot-control table 61 shown in FIG. 2-6.

As shown in FIG. 2-7, the client-terminal boot-control table 61 stores therein a MAC address, an IP address, a name of OS in use, an operating user name, a system area LUN, a user area LUN, and a double log-in processing flag of a booted client terminal. Each field in the client-terminal boot-control table 61 stores therein certain information when registering client terminal information or user authentication information (211 in FIG. 2-2 or 222 in FIG. 2-3).

A double log-in processing flag shown in FIG. 2-7 is a flag that indicates a client terminal of which a log in is determined as effective in the process described in FIG. 2-4 or the process described in FIG. 2-5, if the same user logs in from a plurality of different client terminals.

FIG. 2-8 is a schematic diagram that presents contents of the user information table 62 shown in FIG. 2-6. As shown in FIG. 2-8, the user information table 62 stores therein a password of each user name. The user information table 62 is used at user authentication (222 in FIG. 2-3).

FIG. 2-9 is a schematic diagram that presents contents of the LUN information table 63 shown in FIG. 2-6. As shown in FIG. 2-9, the LUN information table 63 stores therein an LUN, a category of an LU defined by the number of the LUN (a system area LU, or a user area LU), an OS of the LU defined by the number of the LUN, a name of a client terminal in use, and an operating user name. Only when the "category of LU" is the system area LU, a client terminal identifier is stored in the "client terminal using LU", and only when the "category of LU" is the user area LU, a user name is stored in the "name of user using LU". Using the LUN information table 63, the client terminal is notified of the system area LUN and the user area LUN (212 in FIGS. 2-2 and 223 in FIG. 2-3).

FIG. 2-10 is a schematic diagram that presents contents of the storage-device information table 64 shown in FIG. 2-6. As shown in FIG. 2-10, the storage-device information table 64 stores therein an IP address, a port number, and a target name of a storage device with respect to each LUN. When notifying the client terminal of the system area LUN and the user area LUN (212 in FIGS. 2-2 and 223 in FIG. 2-3), also contents of the storage-device information table 64 are simultaneously notified.

FIG. 2-11 is a schematic diagram that presents contents of the client-terminal information table 65 shown in FIG. 2-6. As shown in FIG. 2-11, the client-terminal information table 65 stores therein a MAC address of a client terminal, an IP address of the client terminal, an IP address of the DHCP server 3, and an IP address of the TFTP server 5.

FIG. 2-12 is a schematic diagram that presents contents of the OTP check table 66 shown in FIG. 2-6. As shown in FIG. 2-12, the OTP check table 66 stores therein a user identifier and a one-time password, and an LUN. When the LUN is the system area LU, for example, a "client terminal name" is stored in the "user identifier", and when the LUN is the user area LU, for example, a "user ID" is stored in the "user identifier").

Each field in the OTP check table 66 stores therein certain information when registering client terminal information or user authentication information (211 in FIGS. 2-2 and 222 in FIG. 2-3).

According to the second embodiment, a boot strap file has a user authentication function and an iSCSI initiator function. The user authentication function is to cause a user of the client terminals (1, 2) to input a user name and a password as required, and to transmit an authentication request to the DB server 6. The iSCSI initiator function is to connect the client terminals (1, 2) to the LUs (101 to 103) in a specified storage device based on a received authentication response.

Moreover, according to the second embodiment, the DB server 6 has a client-terminal authentication program for allocating client-terminal administration data to the client terminals (1, 2) by communicating with the client terminals after the client terminals (1, 2) are powered on.

The program is a program to allocate a boot-up OS, an IP address, a host name (a computer name), a domain name, and a system area LU dynamically based on user selection or MAC address information of the client terminals (1, 2).

Furthermore, the DB server 6 has a user authentication program to allocate user authentication information (a program to allocate a user area LU based on the user name) by communicating with the client terminals (1, 2) at the time of a user log in.

As described above, in the network boot system according to the embodiment, the DB server (corresponding to the administration server according to the present invention) authenticates a client terminal and a user, creates an OTP (password) for using a user area LU, registers authentication information that includes the OTP into a database (particularly, the OTP check table), which can be internal or shared with an authentication server, and furthermore, outputs the OTP and LU information (a target name, an LUN, and the like) to the client terminal.

The client terminal makes a use request for the user area LU to a storage device (or a storage router) by using a user ID and the OTP.

The storage device transmits the user ID and the OTP to the DB server directly or via the authentication server, authenticates the user by the DB server, and gives an approval for the use of the LU to the client terminal in accordance with a result of the check.

According to the second embodiment, for example, in a state where the user A has logged in via a first client terminal, if the same user makes a user authentication request (a log-in request) to the DB server via a second client terminal; in a case where the new log-in client is effective, the DB server creates a new OTP for using the LU of the user A, renews an already stores OTP to the new OTP, stores the new OTP into the database, and notifies the second client terminal of LU information (a target name, an LUN, and the like) about the user A, and the renewed OTP.

By contrast, in a case where the existing log-in client is effective, the DB server does not create and renew a new OTP, does not notify the second client terminal of the new OTP, and disapproves the user authentication request from the second client terminal.

Accordingly, a double-log in by the same user can be prevented, and crush of the LU caused by the double-log in by the same user ID can be prevented in the second embodiment.

Alternatively, in the second embodiment, it is possible that the DB server creates an OTP at the time of a user log-in request from a client terminal, registers the OTP into the internal database (or a data base shared with the authentication server), creates "a user name for a use request for the user area LU" added with information about an selected OS, registers the user name into the internal database (or the data base shared with the authentication server), notifies the first client terminal or the second client terminal of the password and the user name for the LU use request, and the client terminals use the password and the user name at the time of the use request for the user area LU.

In this case, the same user can simultaneously use a plurality of terminals with different OSs.

Although in the above explanation the second embodiment is explained in the case where the present invention is applied to a network boot system, the present invention is not limited to this. It is needless to say that present invention can be applied to a network system in which a client terminal accesses a file in an LU in a storage device via a network.

The invention made by the present inventor has been specifically explained by referring to the above embodiment. However, the present invention is not limited to the above embodiment, but it is quite natural that the present invention can be modified in various manners within a scope not departing from the concept of the present invention.

Third Embodiment

FIG. 3-1 is a block diagram that depicts an overview configuration of a network boot system according to a third embodiment of the present invention.

In the network boot system according to the third embodiment, as shown in FIG. 3-1, one or more of the client terminals (1, 2), the DHCP (Dynamic Host Configuration Protocol) server 3, the PXE (Preboot Execution Environment) server 4, the TFTP (Trivial File Transfer Protocol) server 5, the database administration server (hereinafter, DB server) 6, and one or more of the storage devices (10, 11) are connected to each other via the TCP/IP (Transmission Control Protocol/Internet Protocol) network 9. The DHCP server 3, the PXE server 4, the TFTP server 5, and the DB server 6 form an administration server, each of the devices is assigned with an IP address, and the devices can communicate with each other in accordance with TCP/IP.

Each of the storage devices (10, 11) includes one or more of the targets (101 to 103) for storing therein data, and each of the targets includes one or more logical units (hereinafter, LU). Each of the logical units is assigned with a user (an LU can be assigned with a plurality of users, or no user), and stores therein data (for example, OS and application software) required for the user to operate a client terminal.

In the third embodiment, it is assumed to use iSCSI (Internet Small Computer System Interface) as a communication protocol between each of the client terminals (1, 2) and each of the storage devices (10, 11). However, the communication protocol is not limited to iSCSI as long as the protocol is an IP storage-device access-protocol that can be transferred based on TCP/IP.

Instead of connecting the storage devices (10, 11) to the TCP/IP network 9, a storage router can be connected.

The storage router is connected to a storage device that has a communication function in accordance with a storage-device access-protocol other than iSCSI, such as fiber channel (hereinafter, FC) via a network different from the TCP/IP network 9, converts the protocols between iSCSI and FC or another protocol, and relays communication between each of the client terminals (1, 2) and each of the storage devices.

In FIG. 3-1, all or part of the storage devices (10, 11) can be replaced with the storage router, and the system still operate without problem. However, in the following explanation, a case without storage router is explained.

In the network boot system according to the third embodiment, a plurality of LUs provided in the storage devices (10, 11) are separated into a system area LU and user area LUs, each of which is provided for each user. The system area LU stores therein OS, application data, and the like. The user area LU stores therein user data (for example, desk-top setting data, a document file, and the like).

Furthermore, the system area LU includes a master LU and a replica LU copied from the master LU. When accessing the system area LU, the client terminals (1, 2) access the replica LU.

In this case, when the master LU is renewed by the administrator by using an administrative terminal, the storage devices (10, 11) create the replica LU by copying the renewed master LU.

Accordingly, in the third embodiment, the client terminals (1, 2) are configured to access to the replica LU that stores therein an OS and application data, so that it is enough to maintain only the master LU, for example, to be updated. As a result, a maintenance cost for LUs in a storage device can be reduced.

The network boot system according to the third embodiment is explained below with reference to a sequence diagram shown in FIG. 3-2.

When the power is turned on, each of the client terminals (1, 2) transmits a DHCP request to the DHCP server 3 (201 in FIG. 3-2), and the DHCP server 3 replies a DHCP response to each of the client terminals (1, 2) (202 in FIG. 3-2).

By receiving the DHCP response, each of the client terminals (1, 2) obtains an IP address for the TCP/IP network 9. Furthermore, the DHCP response includes an IP address of the PXE server 4, and a command for displaying a menu screen for a user to select an OS.

The client terminals (1, 2) then notify the PXE server 4 of the OS selected by the user (203 in FIG. 3-2), and the PXE server 4 notifies the client terminals (1, 2) of an IP address of the TFTP server 5 and a boot-strap file identifier (204 in FIG. 3-2).

The client terminals (1, 2) then transmit an acquisition request for a boot strap file (a TFTP request) to the specified TFTP server 5 (205 in FIG. 3-2), and download a boot strap file corresponding to the notified boot-strap file identifier from the TFTP server 5 (206 in FIG. 3-2).

The client terminals (1, 2) then expand and execute the downloaded boot strap file on a RAM (Random Access Memory) in each of the client terminals (1, 2) (207 in FIG. 3-2).

The boot strap file in each of the client terminals (1, 2) transmits an IP address request to the DHCP server 3 (208 in FIG. 3-2).

The DHCP server 3 notifies each the client terminals (1, 2) of an IP address (209 in FIG. 3-2).

The boot strap file in each of the client terminals (1, 2) then transmits a client-terminal authentication request to the DB server 6 (210 in FIG. 3-2).

The DB server 6 authenticates the client terminals (1, 2), and registers client terminal information into an internal database (211 in FIG. 3-2).

The DB server 6 then notifies the boot strap file in each of the client terminals (1, 2) of a logical unit number (hereinafter, LU) of a system area (212 in FIG. 3-2). At the same time, the DB server 6 notifies the client terminals (1, 2) of an IP address, a port number, and a target name, of a storage device that stores therein an LU defined by the notified LUN.

The notification of the system area LUN can be executed at the step 209.

The boot strap file then issues a use request for a system area LU defined by the notified LUN to the storage devices (10, 11) (213 in FIG. 3-2), waits a use response for the system area LUN from the storage devices (10, 11), and mounts the system area LU defined by the notified number onto the client terminals (1, 2), and boots the terminals (214 in FIG. 3-2). By the operation, the start of the OS is finished (215 in FIG. 3-2).

Waiting log in by a user (216 in FIG. 3-2) in the next step, the OS of the client terminals (1, 2) transmits a user authentication request to the DB server 6 (217 in FIG. 3-2). At the moment, the OS of the client terminals (1, 2) notifies the DB server 6 of a user ID and a password.

The DB server 6 confirms authenticity of the user, and registers user information into the internal database (218 in FIG. 3-2).

The DB server 6 then notifies the OS of the client terminals (1, 2) of the LUN of a user area (219 in FIG. 3-2). At the same time, the DB server 6 notifies the OS of the client terminals (1, 2) of an IP address, a port number, and a target name, of a storage device that stores therein an LU defined by the notified number.

The OS of the client terminals (1, 2) then transmits a use request for a user area LU defined by the notified LUN to the storage devices (10, 11) (220 in FIG. 3-2), waits a use response for the user area LUN from the storage devices (10, 11) (221 in FIG. 3-2), and mounts the user area LU defined by the notified number onto the client terminals (1, 2).

FIG. 3-3 is a schematic diagram that presents varieties of tables managed within the DB server 6 shown in FIG. 3-1.

As shown in FIG. 3-3, in the DB server 6, the client-terminal boot-control table 61, the user information table 62, the LUN information table 63, the storage-device information table 64, and the client-terminal information table 65 are provided.

FIG. 3-4 is a schematic diagram that presents contents of the client-terminal boot-control table 61 shown in FIG. 3-3.

As shown in FIG. 3-4, the client-terminal boot-control table 61 stores therein a MAC address, an IP address, a name of OS in use, an operating user name, a system area LUN, and a user area LUN of a booted client terminal. Each field in the client-terminal boot-control table 61 stores therein certain information when registering client terminal information shown in FIG. 2 (211 in FIG. 3-2 or when registering user authentication information (218 in FIG. 3-2).

FIG. 3-5 is a schematic diagram that presents contents of the user information table 62 shown in FIG. 3-3. As shown in FIG. 3-5, the user information table 62 stores therein a password of each user name. The user information table 62 is used at user authentication (218 in FIG. 3-2).

FIG. 3-6 is a schematic diagram that presents contents of the LUN information table 63 shown in FIG. 3-3. As shown in FIG. 3-6, the LUN information table 63 stores therein an LUN, a category of an LU defined by the number of the LUN, a type of the LU defined by the number of the LUN, an OS name assigned with the number of the LUN, a name of a client terminal using the LU defined by the number of the LUN, and a name of a user using the LU defined by the number of the LUN.

The category of LU clarifies the distinction between the system area LU and the user area LU. The type of the LU stores there in an effective value (the master LU or the replica LU) only when the category of the LU is the system area LU.

The name of the client terminal using the LU stores therein a MAC address of the client terminal as a client terminal identifier only when the category of the LU is the system area LU. The name of the user using the LU stores therein a user name only when the category of the LU is the user area LU. Using the LUN information table 63, the client terminal is notified of the system area LUN and the user area LUN (212 in FIG. 3-2 and 219 in FIG. 3-2).

FIG. 3-7 is a schematic diagram that presents contents of the storage-device information table 64 shown in FIG. 3-3. As shown in FIG. 3-7, the storage-device information table 64 stores therein an IP address, a port number, and a target name of a storage device with respect to each LUN. When notifying the client terminal of the system area LUN and the user area LUN (212 in FIG. 3-2 and 219 in FIG. 3-2), also contents of the storage-device information table 64 is simultaneously notified.

FIG. 3-8 is a schematic diagram that presents contents of the client-terminal information table 65 shown in FIG. 3-3. As shown in FIG. 3-8, the client-terminal information table 65 stores therein a MAC address of a client terminal, an IP address of the client terminal, an IP address of the DHCP server 3, and an IP address of the TFTP server 5.

According to the embodiment, the DB server 6 has a client-terminal authentication program for allocating client-terminal administration data to the client terminals (1, 2) by communicating with the client terminals after the client terminals (1, 2) are powered on.

The program is a program to allocate a boot-up OS, an IP address, a host name (a computer name), a domain name, and a system area LU dynamically based on user selection or MAC address information of the client terminals (1, 2).

Furthermore, the DB server 6 has a user authentication program to allocate user authentication information (a program to allocate a user area LU based on the user name) by communicating with the client terminals (1, 2) at the time of a user log in.

FIG. 3-9 is a schematic diagram for explaining features of the third embodiment.

According to the third embodiment, as shown in FIG. 3-9, master LUs provided in the storage devices (10, 11) include a plurality of master LUs each of which stores therein a plurality of OSs, for example, appropriate to usage and a state. As shown in FIG. 3-10, the master LUs are administrated based on an OS name and a version.

An administrator performs maintenance (an OS update, an installation of an application program, a virus check, and backup) of the master LUs by using an administrative terminal 70.

When any one of the master LUs is renewed, the storage devices (10, 11) create one or more replica LUs by copying the renewed master LU. For example, the same number of replica LUs as the number of client terminals is created.

Moreover, the storage devices (10, 11) notify the DB server 6 of LUNs of the master LU and the replica LU, an IP address, a port number, and a target name of a storage device that stores therein the LUs defined by the LUNs.

Such information is stored in the storage-device information table 64 and the LUN information table 63 in the DB server 6.

The client terminals A, B, and C boot up by using the replica LUs based on the LUNs notified from the DB server 6.

Accordingly, the administrator performs maintenance or installation of an application program on the master LUs once, and the operation can be reflected onto the system area LUs used by the client terminals (1, 2).

Even if the number of client terminals is increased, time and effort or administration costs are not increased.

Although in the above explanation the embodiment is explained in the case where the present invention is applied to a network boot system in which the client terminals (1, 2) mount the user area LU after mounting the system area LU, the present invention is not limited to this. It is needless to say that present invention can be applied to a network boot system in which the client terminals (1, 2) simultaneously mount the user area LU and the system area LU.

The invention made by the present inventor has been specifically explained by referring to the third embodiment. However, the present invention is not limited to the third embodiment, but it is quite natural that the present invention can be modified in various manners within a scope not departing from the concept of the present invention.

Fourth Embodiment

In a fourth embodiment below, a storage system is explained, which administrates data mounted on a client terminal (for example, a user terminal) over a plurality of generations, and controls by receiving a mount request from the client terminal. In the following description, a configuration and a flow of operation of the storage system according to the fourth embodiment is explained in order, and finally effects by the fourth embodiment are explained.

[Configuration of Storage System (Fourth Embodiment)]

First of all, a configuration of the storage system according to the fourth embodiment is explained below with reference to FIG. 4-1. As shown in the figure, the storage system (say, a configuration N11) includes a plurality of user terminals, an administrative terminal, a storage device 80, and a DB server 90. The storage device 80 and the DB server 90 are connected to the user terminals via a network in a state where the devices can communicate with each other. The storage device 80 includes a storage unit 81, a disk operation unit 82, and a mount control unit 83. The DB server 90 includes a generation administrating table 91, a generation switching unit 92, and a mount control unit 93.

The storage unit 81 in the storage device 80 is a storing unit that stores therein certain data, and includes an operation system disk, a backup system disk, and a standby system disk. The operation system disk stores therein operation system data to be principally mounted onto a user terminal. The backup system disk stores therein backup system data to be principally mounted onto a user terminal. The standby system disk stores therein standby system data to be principally mounted onto the administrative terminal. Each of the disks stores therein data, for example, an OS and an application program. The backup system disk and the operation system disk receive a use from a user terminal (RO: Read Only, a use of reading only). The standby system disk does not receive a use from a user terminal, but accepts a use from the administrative terminal (Read/Write, a use of reading or writing).

The generation administrating table 91 in the DB server 90 is a table to be used for control (mount control and disk switching control) of each disk provided in the storage unit 81 in the storage device 80, and is configured in which disk information is stored by associating with each of the backup system, the operation system, and the standby system.

The generation switching unit 92 in the DB server 90 is a processing unit that receives a switching request from the administrative terminal, changes disk information (a volume name) in the generation administrating table 91, and controls the storage device 80. Specifically, the generation switching unit 92 changes backup system disk information, operation system disk information, and standby system disk information in accordance with a switching request (a system switching request or a system switching-back request) received from the administrative terminal (see FIGS. 4-3 and 4-5). The operation is intended to reflect a renewal (for example, an update of an OS or an application program) onto data included in the operation system disk, and to recover data failure included in the operation system disk. In addition, disk information in the generation administrating table 91 is changed by the generation switching unit 92, as a result, the mount of the user terminal is continued.

Moreover, the generation switching unit 92 issues a control message to the disk operation unit 82 in the storage device 80, and causes the disk operation unit 82 to execute deletion or copy of a volume in each disk provided in the storage unit 81. If the disk operation unit 82 in the storage device 80 then executes a copy of a disk, and gives a new volume name to the copied disk; the generation switching unit 92 acquires the volume name, and changes disk information in the generation administrating table 91. The generation switching unit 92 issues a control message for copying and deletion of a volume of a disk, but does not issue control message for a move of the volume of the disk (only changing the generation administrating table 91).

Subsequently, the disk operation unit 82 in the storage device 80 is a processing unit that receives the control message from the generation switching unit 92 in the DB server 90, and executes deletion or a copy of a volume in each disk provided in the storage unit 81. Specifically, if executing switching of disk systems (switching of generations) such that a standby system disk including renewal data is set to be a new operation system disk in accordance with the control message received from the generation switching unit 92 in the DB server 90, the disk operation unit 82 copies the standby system disk including renewal data, creates an operation system disk, and gives a new volume name to the created operation system disk. Moreover, the disk operation unit 82 deletes the backup system disk including backup system data. When switching systems, the standby system disk including renewal data is retained without change as a standby system disk.

Moreover, if executing switching-back of disk systems (switching of generations) such that a backup system disk including renewal data in the previous generation is set to be a new operation system disk in accordance with the control message received from the generation switching unit 92 in the DB server 90, the disk operation unit 82 copies the backup system disk including the renewal data in the previous generation, creates an operation system disk and a standby system disk, and gives a new volume name to each of the created operation system disk and the created standby system disk. Moreover, when switching back the system, the disk operation unit 82 deletes the standby system disk including standby system data without change.

The mount control unit 93 in the DB server 90 is a processing unit that controls a mount of a user terminal. Specifically, when the mount control unit 93 receives a communication request from a user terminal via the network, the mount control unit 93 acquires operation system disk information from the generation administrating table 91, issues a response message on which the operation system disk information is provided to the user terminal, and writes the operation system disk information provided on the response message into the system area LUN (see in FIG. 3-4) in the client-terminal boot-control table (see 61 in FIG. 3-3).

The mount control unit 83 in the storage device 80 is a processing unit that receives and executes a mount request from a user terminal. Specifically, when a user terminal (a computer program in the user terminal) that has received a response message from the mount control unit 93 in the DB server 90 separates operation system disk information form the response message, and then the mount control unit 83 receives a mount request together with the operation system disk information, the mount control unit 83 controls mount of the operation system disk onto the user terminal.

In addition, as a result of above processing performed by the DB server 90 and the storage device 80, even if the DB server 90 receives a disk switching request from the administrative terminal, presence of a disk mounted on a user terminal can be kept free from control by any entity, so that mount of the user terminal is continued.

In other words, specifically, in a state where the operation system disk is mounted on the user terminal, when the DB server 90 receives a disk-system switching request to set the standby system disk including renewal data to be a new operation system disk, and the generation switching unit 92 in the DB server 90 changes the generation administrating table 91 such that an old operation system disk is set to be a new backup system disk; the old operation system disk that has become the new backup system disk is continuously mounted on the user terminal.

In a state where the operation system disk is mounted on the user terminal, when the DB server 90 receives a request for switching-back of disk systems (switching of generations) such that the backup system disk including the renewal data in the previous generation is set to be a new operation system disk, and the generation switching unit 92 in the DB server 90 changes the generation administrating table 91 such that the old backup system disk is set to be a new backup system disk; the old operation system disk that has become the new backup system disk is continuously mounted on the user terminal. By the mount control, only information within the generation administrating table 91 is changed, and there is no change in volumes in each disk provided in the storage unit 81 in the storage device 80 mounted on the user terminal.

[System Switching Operation (Fourth Embodiment)]

Transitions of real volumes corresponding to respective disk information in the generation administrating table executed by a system switching operation of a storage system according to the fourth embodiment are explained below with reference to FIGS. 4-2 and 4-3. FIG. 4-2 is a schematic diagram that depicts transitions of real volumes corresponding to respective disk information in the generation administrating table executed by a system switching operation of the storage system according to the fourth embodiment. FIG. 4-3 is a schematic diagram that presents a configuration example of the generation administrating table according to the fourth embodiment. Each number described in each disk shown in FIG. 4-2 indicates a generation of data stored in the disk.

As shown in FIG. 4-2, the storage system according to the fourth embodiment executes transitions of real volumes corresponding to respective disk information in the generation administrating table by a system switching operation. Specifically, the generation switching unit 92 receives a disk-system switching request to set the standby system disk including renewal data to be a new operation system disk, and changes the backup system disk information, the operation system disk information, and the standby system disk information, as shown in FIG. 4-3.

Subsequently, the generation switching unit 92 issues a control message to the disk operation unit 82 in the storage device 80, and causes the disk operation unit 82 to execute deletion or copying of a volume in each disk provided in the storage unit 81. The disk operation unit 82 in the storage device 80 then receives the control message from the generation switching unit 92 in the DB server 90, and executes deletion or copying of a volume in each disk provided in the storage unit 81.

Thus, as shown the generation administrating table in FIG. 4-3, a standby system disk C including renewal data is copied to an operation system disk D (from generation 0 to generation 1); an operation system disk B is moved to a backup system disk B (the generation remains at 0); and a backup system disk A is deleted. The standby system disk C including renewal data remains as the standby system disk C.

If further receiving a disk-system switching request to set the standby system disk including renewal data to be a new operation system disk again, as shown the generation administrating table in FIG. 4-3, the standby system disk C including renewal data is copied to an operation system disk E (from the generation 1 to the generation 2); the operation system disk D is moved to a backup system disk D (from the generation 0 to the generation 1); and the backup system disk B is deleted. The standby system disk C including renewal data remains as the standby system disk C.

[Switching-Back Operation (Fourth Embodiment)]

Transitions of real volumes corresponding to respective disk information in the generation administrating table executed by a system switching-back operation of a storage system according to the fourth embodiment are explained below with reference to FIGS. 4-4 and 4-5. FIG. 4-4 is a schematic diagram that depicts transitions of real volumes corresponding to respective disk information in the generation administrating table executed by a system switching-back operation of the storage system according to the fourth embodiment. FIG. 4-5 is a schematic diagram that presents a configuration example of the generation administrating table according to the fourth embodiment.

As shown in FIG. 4-4, the storage system according to the fourth embodiment executes a transition of a real volume corresponding to each disk information in the generation administrating table by a system switching operation. Specifically, the generation switching unit 92 receives a disk-system switching-back request to set the backup system disk including renewal data in the previous generation to be a new operation system disk, and changes the backup system disk information, the operation system disk information, and the standby system disk information, as shown in FIG. 4-5.

Subsequently, the generation switching unit 92 issues a control message to the disk operation unit 82 in the storage device 80, and causes the disk operation unit 82 to execute deletion or copying of a volume in each disk provided in the storage unit 81. The disk operation unit 82 in the storage device 80 then receives the control message from the generation switching unit 92 in the DB server 90, and executes deletion or copying of a volume in each disk provided in the storage unit 81.

Thus, as shown the generation administrating table in FIG. 4-5, the backup system disk A including renewal data in the previous generation is copied to the operation system disk A (from the generation 1 to the generation 0) and is copied to the standby system disk D (from the generation 2 to the generation 0); the operation system disk B is moved to the backup system disk B (the generation remains at 1); and the standby system disk C is deleted.

If further receiving a disk-system switching-back request to set the backup system disk including renewal data in the previous generation to be a new operation system disk again, as shown the generation administrating table in FIG. 4-5, the backup system disk B including renewal data in the previous generation is copied to the operation system disk B (from the generation 0 to the generation 1) and a standby system disk E (from the generation 0 to the generation 1); the operation system disk A is moved to the backup system disk A (the generation remains at 0); and the standby system disk D is deleted.

As a method of executing a copy of data when switching systems and switching-back systems, the copy of data can be executed by using a function of the storage device, such as a snap shot or a clone, or data can be simply copied onto a free-space disk.

Effect of Fourth Embodiment

As described above, according to the fourth embodiment, when switching generations to set a standby system disk to be a new operation system disk, a disk in a generation stored as an operation system disk is switched to be a backup system disk, and a mount on a client terminal is continued by using the backup system disk if the generation of the client terminal is switched while the operation system disk is mounted on the client terminal. Consequently, a switching operation to a new generation can be performed without stopping processing performed by the client terminal on which the operation system disk is currently mounted.

Moreover, according to the fourth embodiment, a standby system disk is stored separately from an operation system disk and a backup system disk, and a use by a client terminal is approved only for the operation system disk and the backup system disk. Consequently, a renewing operation of the standby system disk can be performed without stopping processing performed by the client terminal that is currently using the operation system disk and the backup system disk.

Furthermore, according to the fourth embodiment, when switching generations to set a standby system disk to be a new operation system disk, a disk in a generation stored as a standby system disk is continuously set as the standby system disk. Consequently, just after the switching of generations, the operation system disk and the standby system disk have the same contents, so that a renewing operation of the standby system disk can be started efficiently.

Moreover, according to the fourth embodiment, when switching generations to set a backup system disk to be back to an operation system disk, a disk in a generation stored as an operation system disk is switched to be a backup system disk, a mount on a client terminal is continued by using the backup system disk if the generation of the client terminal is switched while the operation system disk is mounted on the client terminal, and a mount on a terminal is continued by using the operation system if the generation of the client terminal is switched while the backup system disk is mounted on the client terminal. Consequently, a switching operation to the previous generation can be performed without stopping processing performed by the client terminal on which the operation system disk and the backup system disk are currently mounted.

Furthermore, according to the fourth embodiment, when switching generations to set a backup system disk to be back to an operation system disk, a disk in a generation stored as a backup system disk is switched to be a standby system disk. Consequently, just after the switching of generations, the operation system disk and the standby system disk have the same contents, so that a renewing operation of the standby system disk can be started efficiently.

Figures 1, 2, 3, 4, 5, 6, 7, 8, 9, 10, 11:
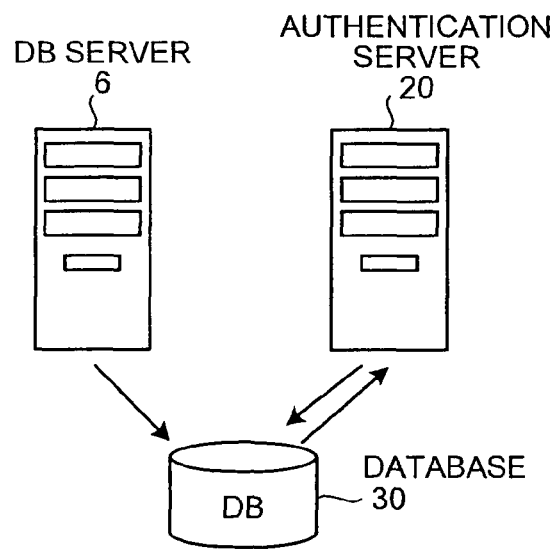
Figures 1, 2, 3, 4, 5, 6, 7, 8, 9, 10, 11, 12:
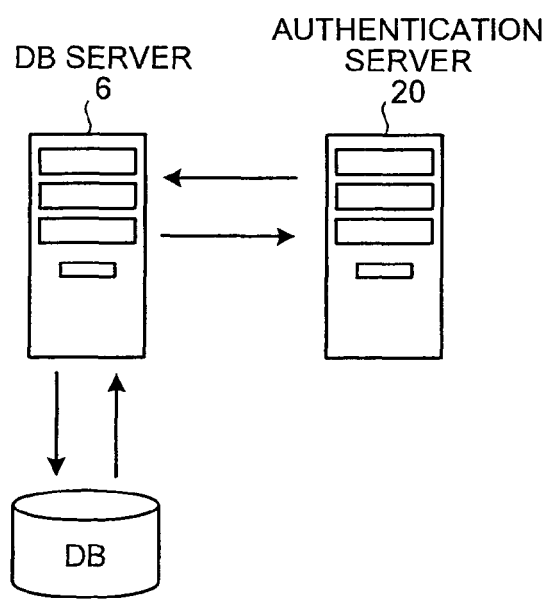
Figures 1, 2:
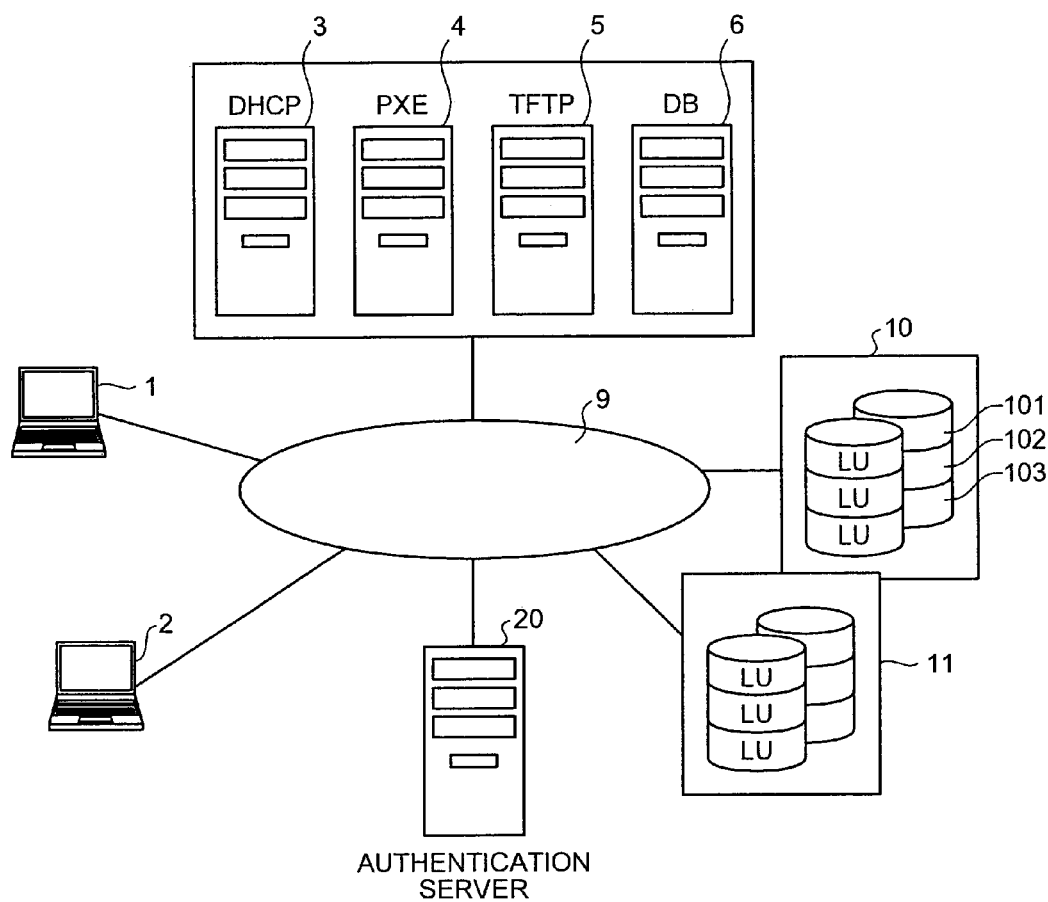
Figures 2, 3:
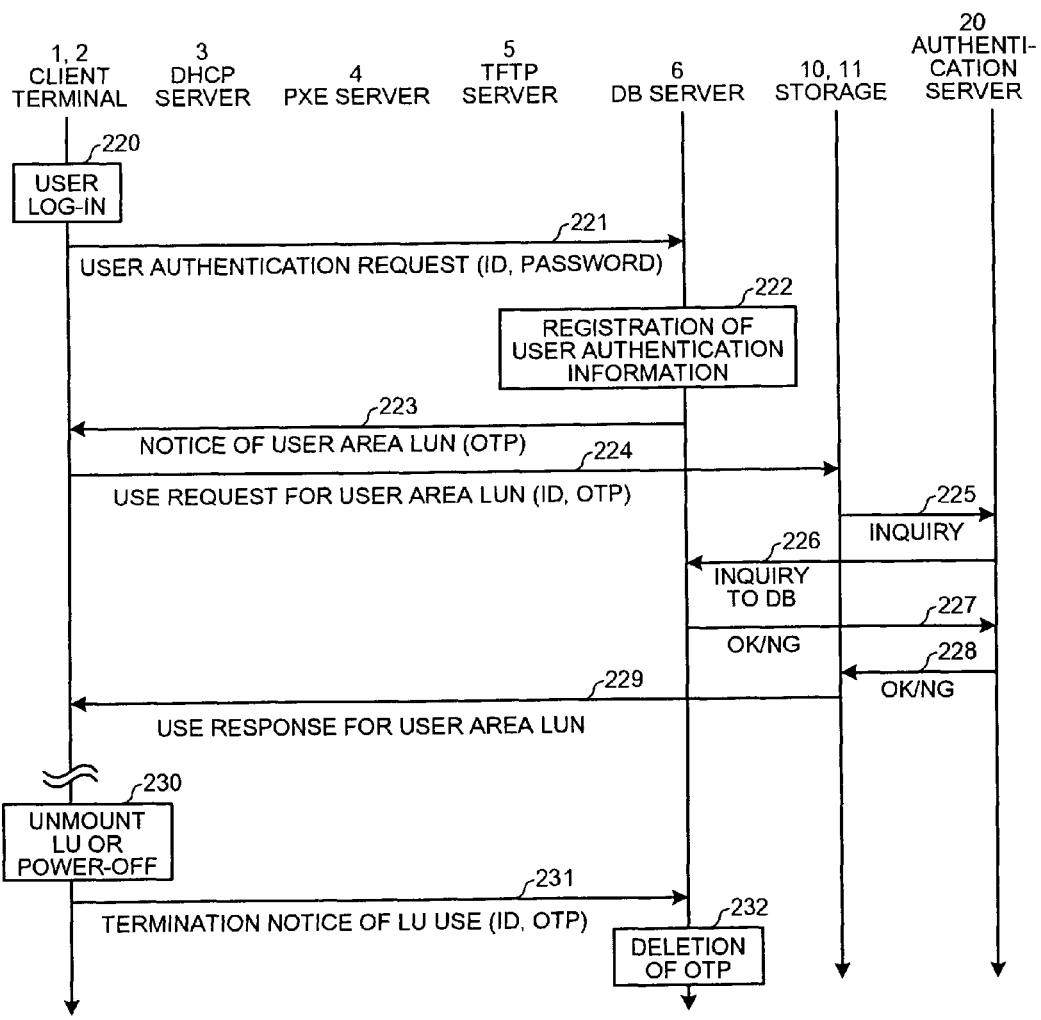
Figures 2, 3, 4:
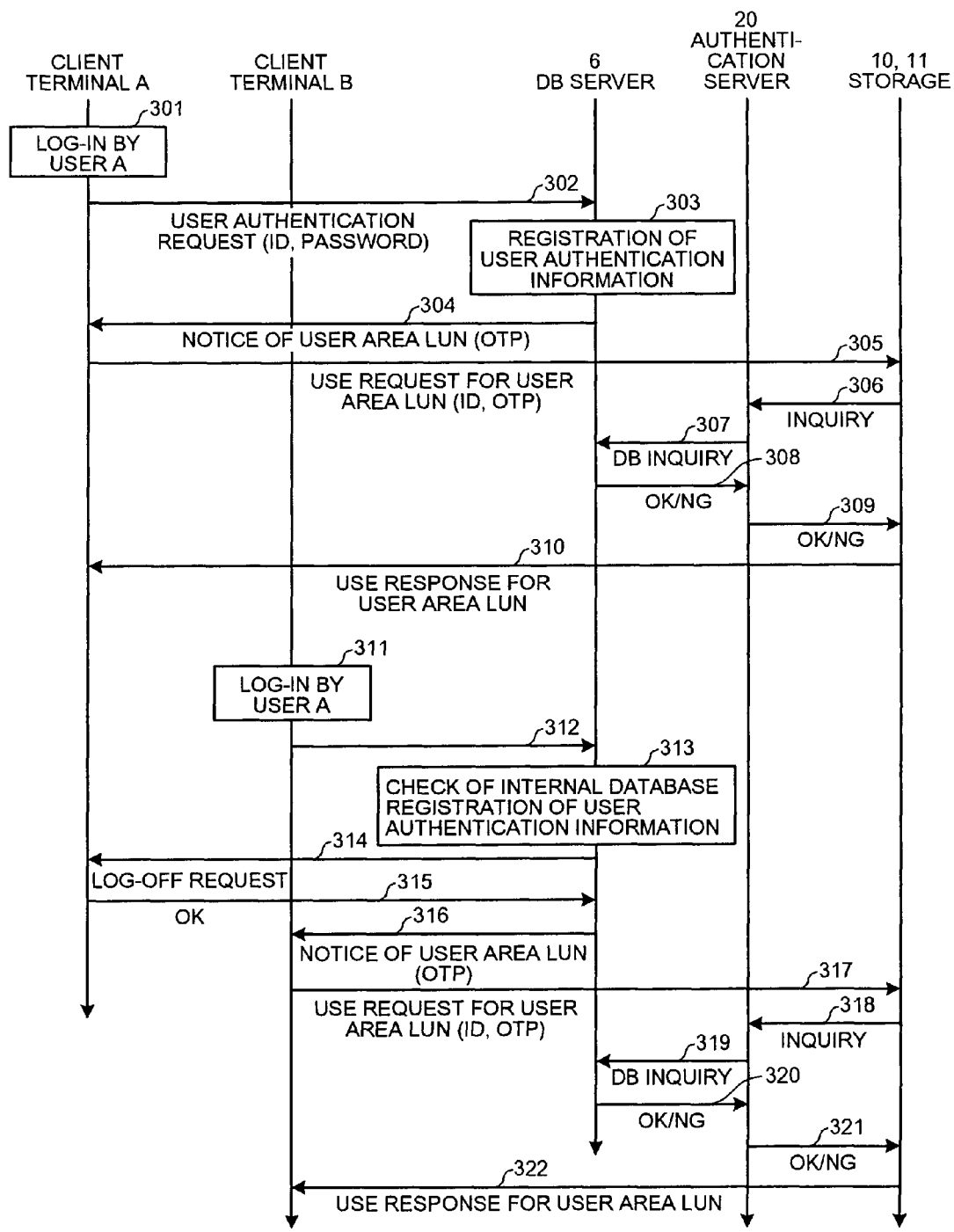
Figures 2, 3, 4, 5:
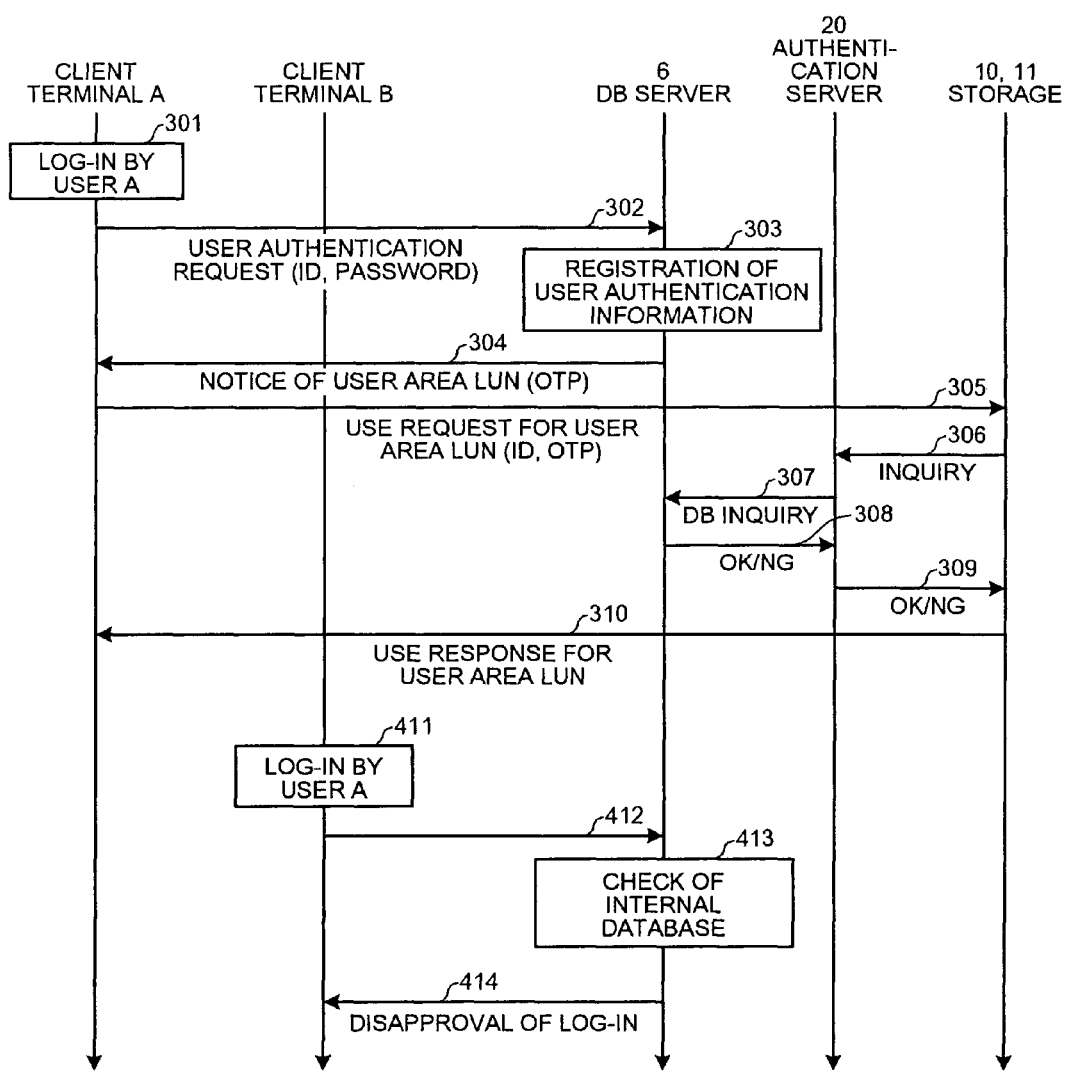
Figures 2, 3, 4, 5, 6, 7:
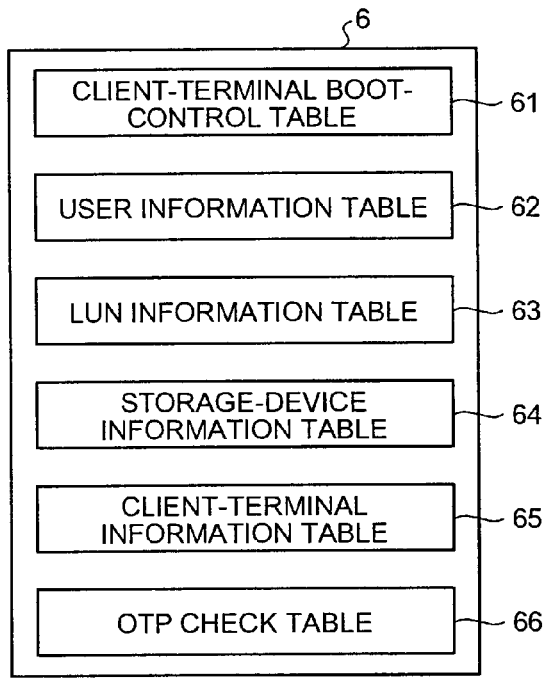
Figures 2, 3, 4, 5, 6, 7, 8, 9, 10, 11, 12, 13:
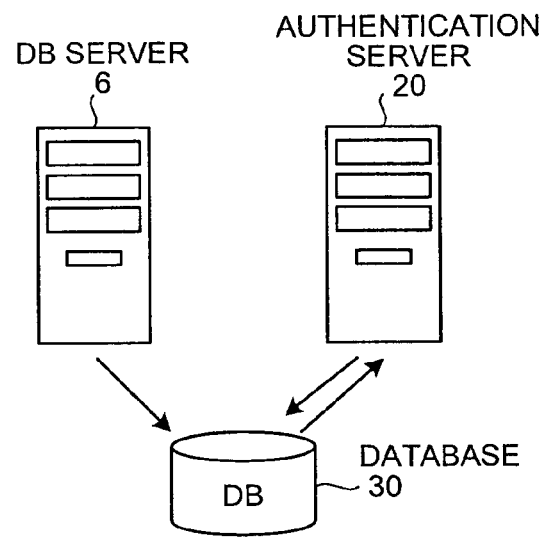
Figures 2, 3, 4, 5, 6, 7, 8, 9, 10, 11, 12, 13, 14:
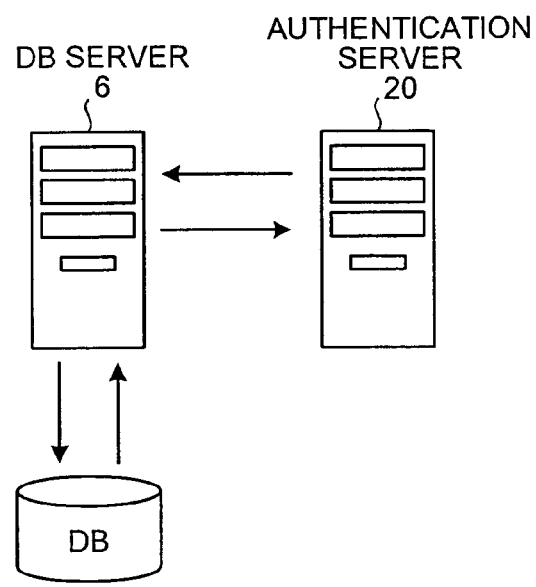
Figures 1, 3:
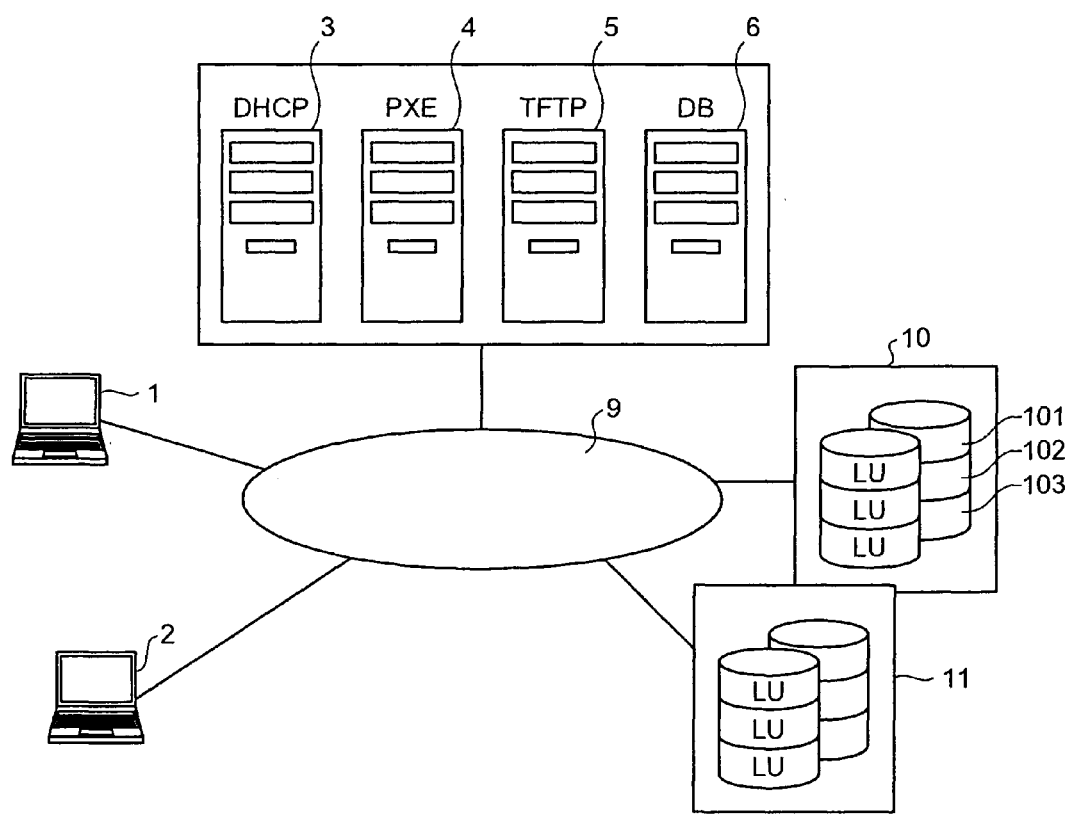
Figures 2, 3:
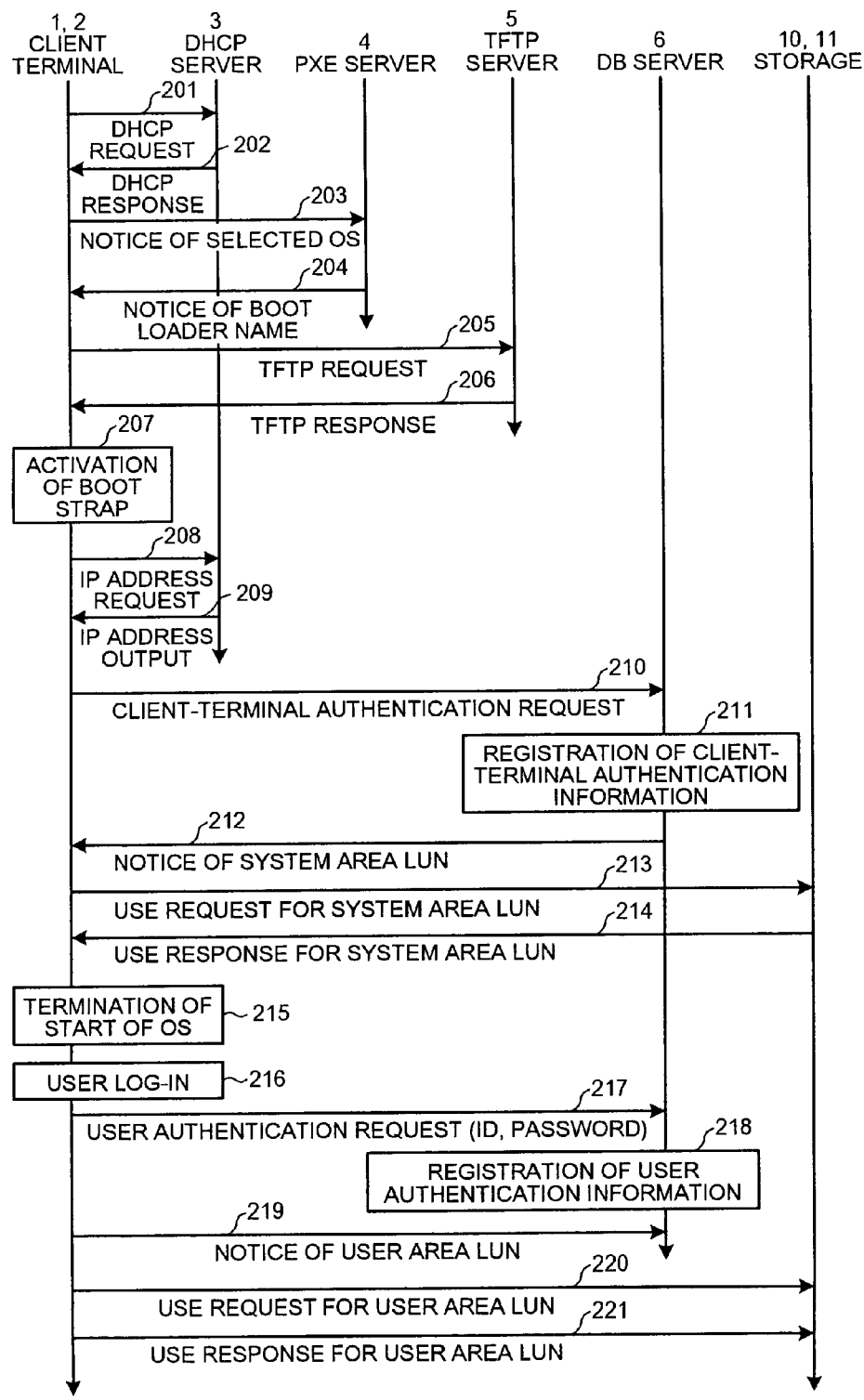
Figures 3, 4:
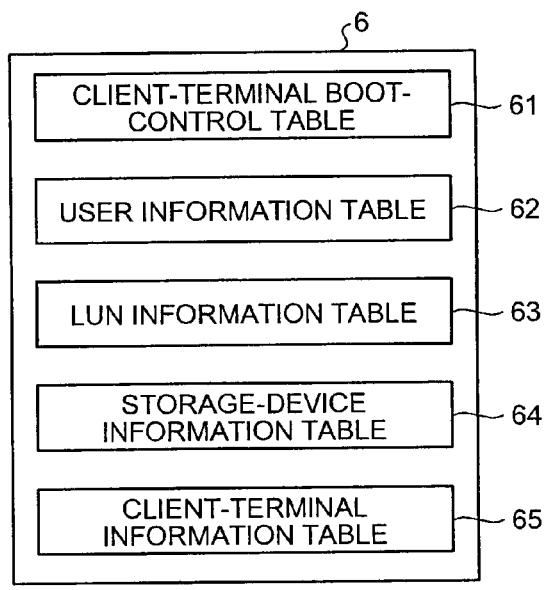
Figures 3, 4, 5, 6, 7, 8, 9:
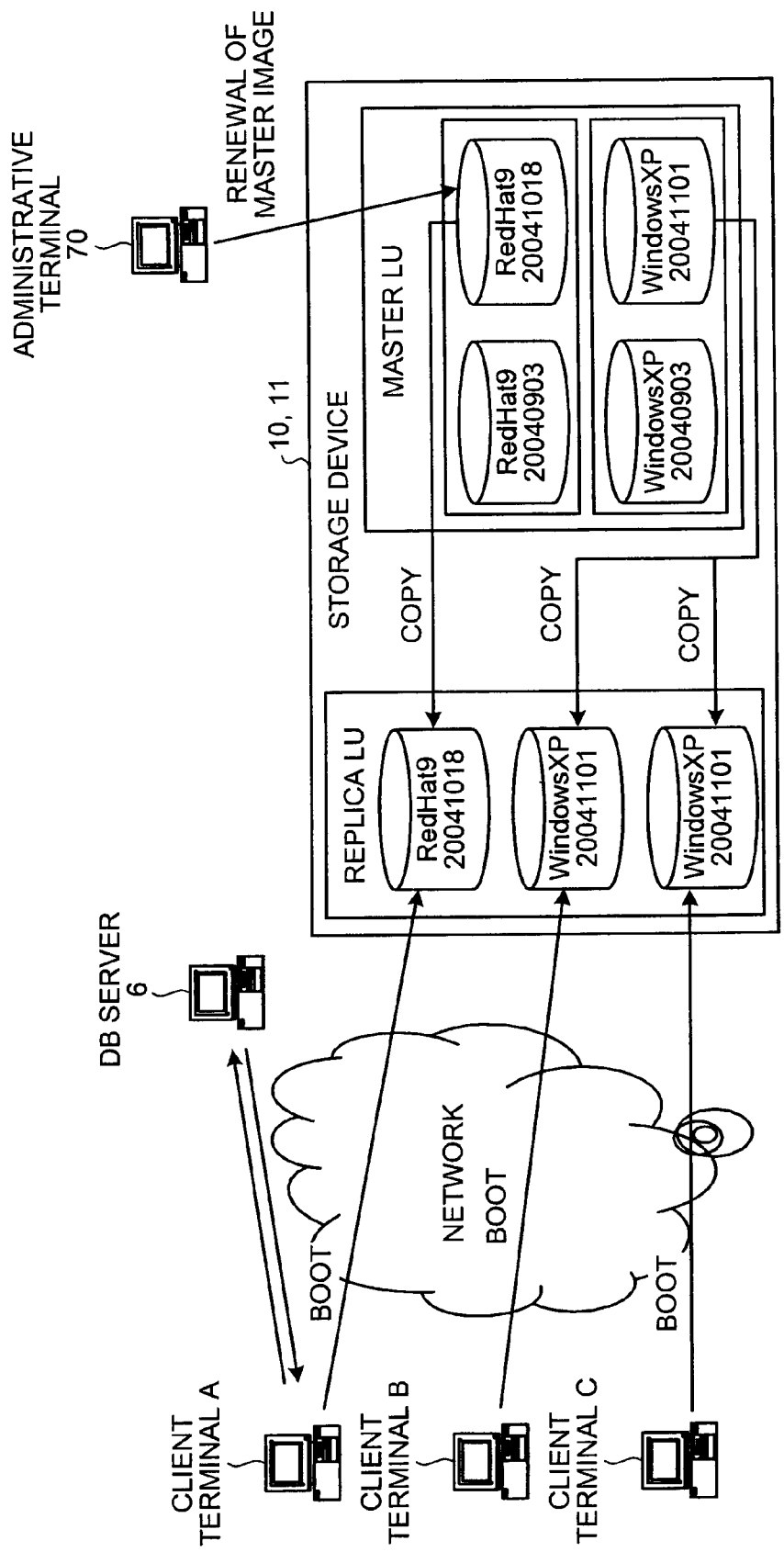
Figures 2, 4:
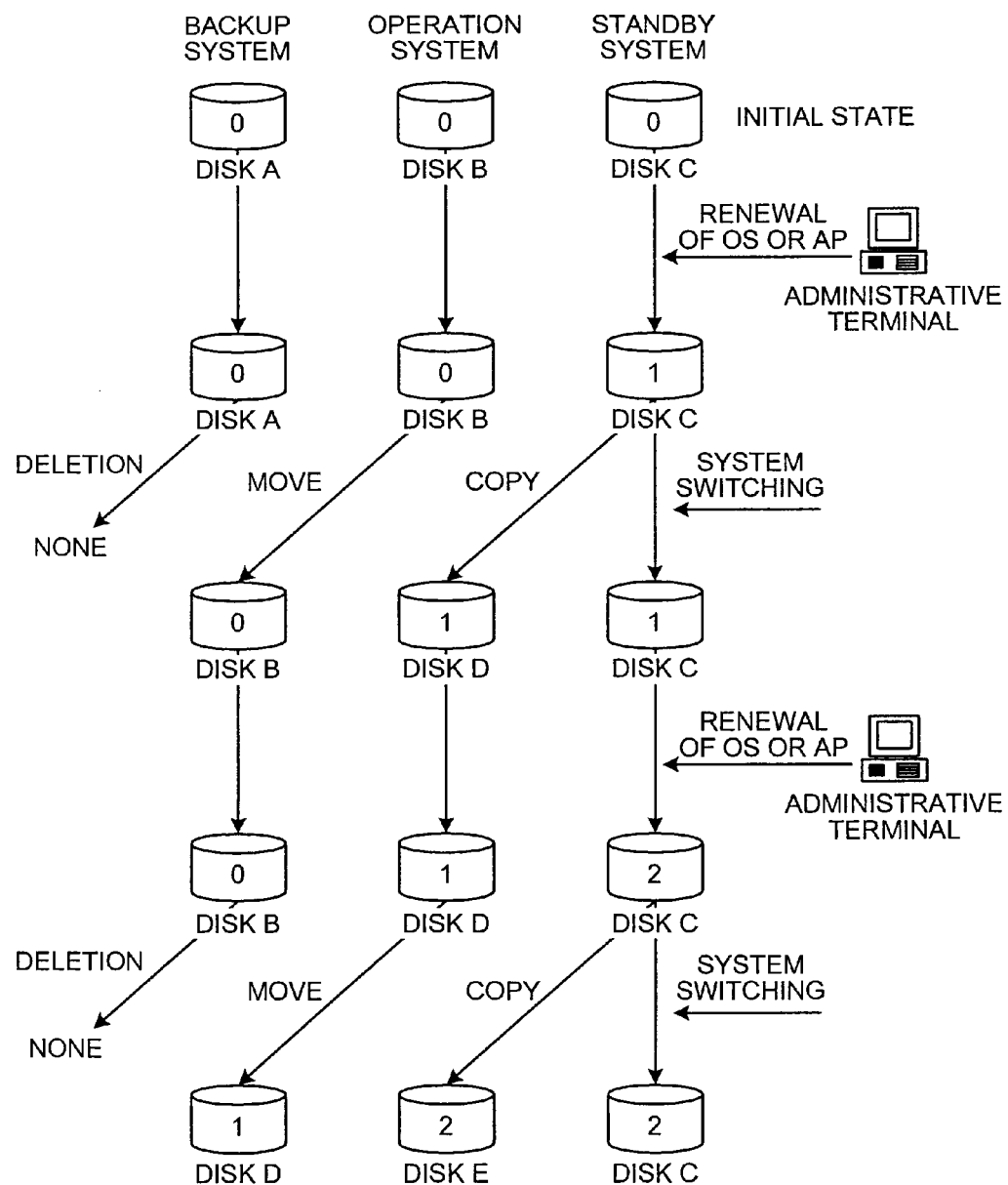
Figure 4:
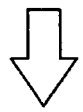
Figure 3:
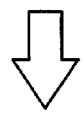
Figure 4:
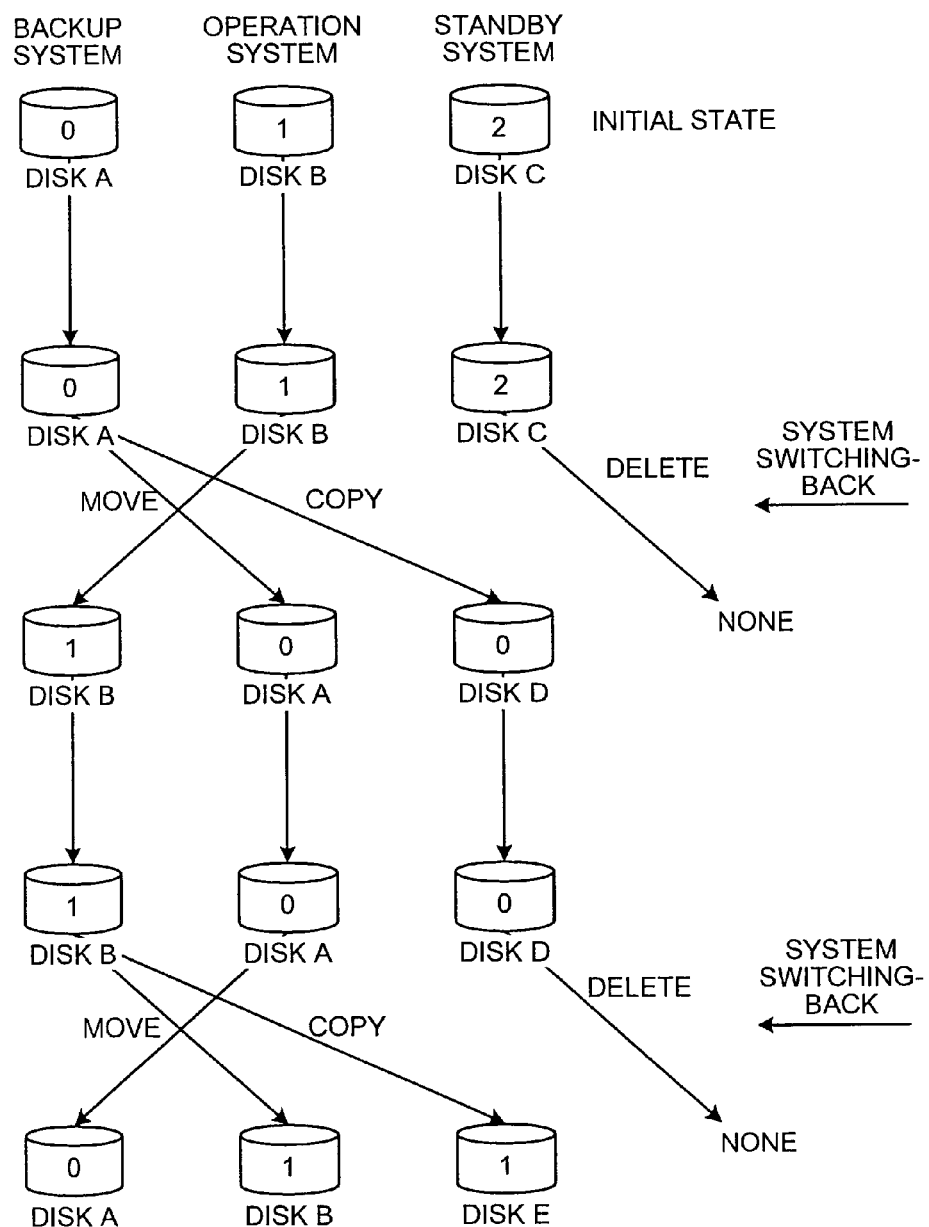
Figure 4:
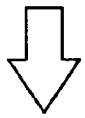
Figure 5:
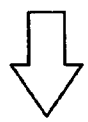
Figures 4, 5, 6:
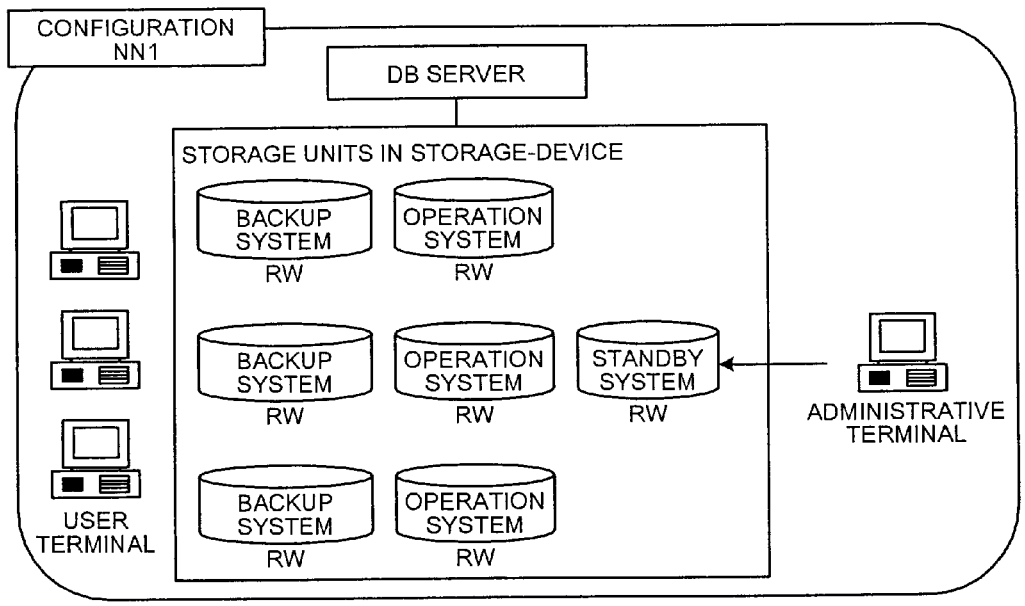
Figures 4, 5, 6, 7:
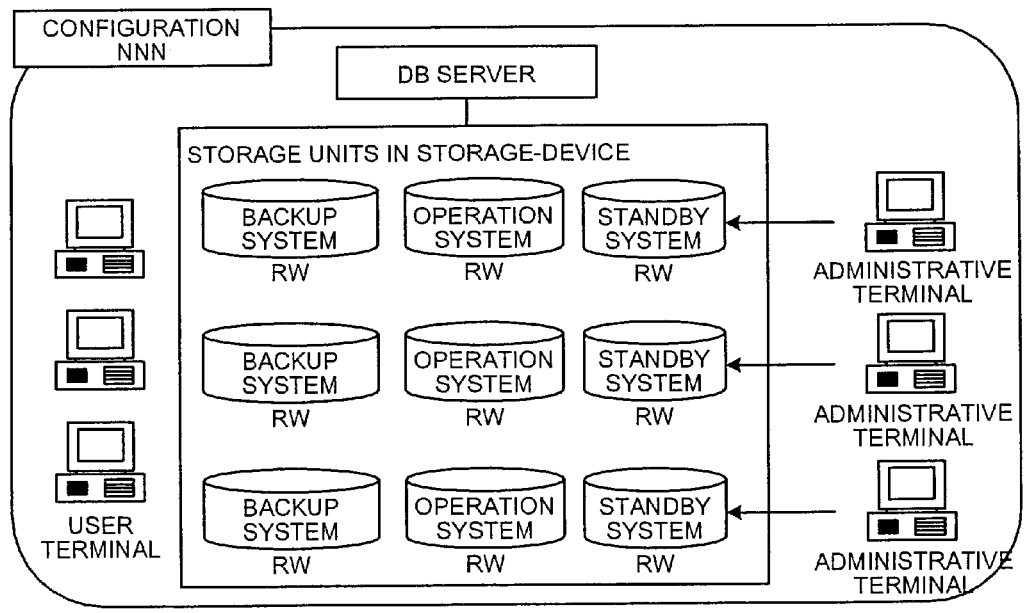

Although in the embodiments described above, the network boot system (say, a configuration N11) that includes the same backup system disk, the same operation system disk, and the same standby system disk, all of which are shared with all user terminals is explained, the present invention is not limited to this. For example, as shown in FIG. 4-6, a network boot system (say, a configuration NN1) can include backup system disks and operation system disks specific to respective user terminals, and the same standby system disk shared with the all user terminals. Alternatively, as shown in FIG. 4-7, a network boot system (say, a configuration NNN) can include backup system disks, operation system disks, and standby system disks, all of which are specific to respective user terminals.

In other words, in the configuration NN1, the system switching operation (see FIG. 4-2) and the system switching-back operation (see FIG. 4-4) as described above are performed between backup system disks and operation system disks specific to respective user terminals, and standby system disks common to the all user terminals. In the configuration NNN, the system switching operation (see FIG. 4-2) and the system switching-back operation (see FIG. 4-4) are performed between backup system disks, operation system disks, and standby system disks specific to respective user terminals.

Each of user terminals boots up from each operation system disk specific to the user terminal, so that an operation of switching to a new generation can performed, and a renewing operation of the standby system disk can be performed without stopping processing performed by the client terminal on which the operation system disk is currently mounted, while coping with a variety of usage (for example, reading and writing) by users.

Configuration elements of the storage system shown in FIG. 4-1 are described as functional concepts, and the storage system does not need to be physically configured as the same as shown in the figure.

In other words, a practical form of separation and integration of the storage system is not limited to that shown in the figure; for example, the storage device 80 and the DB server 90 can be integrated, i.e., all or part of the storage system can be configured by separating or integrating functionally or physically per any segment as required, depending on various loads and service conditions.

In addition, the fourth embodiment is explained above in the case where each of the operation system disk, the backup system disk, and the standby system disk included in the storage unit 81 in the storage device 80 includes one generation; however, the present invention is not limited to this. Backup system disks and standby system disks can include a plurality of generations. As the backup system disks include a plurality of generations, the disks can be reached back through several generations in accordance with the system switching-back operation; and as the standby system disks include a plurality of generations, a correction on a disk in a certain generation can be executed.

INDUSTRIAL APPLICABILITY

As described above, a network system, a control method for access to a storage device, an administration server, a storage device, a log-in control method, a network boot system, and a method for access to an individual storage unit according to the present invention are useful for a system for a client terminal to mount thereon an individual storage unit in a storage device connected via a network, and a method for access to the system for a client terminal to mount thereon an individual storage unit in a storage device connected via a network, a network boot system, and an individual storage unit; and particularly suitable for prevention of an unauthorized access to an individual storage unit of which a use is not approved by an administration server, prevention of crush of an individual storage unit caused by a double-log in with the same user ID by preventing the double-log in by the same user, and reduction in maintenance costs for individual units in a storage device.

The invention claimed is:

1. A network boot system comprising:
a plurality of client terminals and the network boot system comprises a plurality of storage units separated into a system area and a user area in storage devices for each user;
at least one storage device including a plurality of storage units, which includes a master storage unit; and
a network to connect the plurality of client terminals, and the storage device to each other, wherein the storage device creates a plurality of replica storage units by copying the master storage unit, and
the plurality of client terminals load data required for operation from the same one or different ones of the plurality of replica storage units:
said system area storage unit includes the master storage unit and at least one of the replica storage units wherein when the master storage unit is updated and stored in the at least one storage device, the storage device copies the updated master storage unit to update the replica storage units, and the plurality of client terminals do not load the data required for operation from the master storage unit after the master storage unit is updated and stored in the at least one storage device so as to reduce a maintenance cost for storage units in a storage device by performing maintenance only to the master storage unit.

2. The network boot system according to claim 1, wherein the master storage unit stores therein an operating system and an application program.

3. The network boot system according to claim 1, further comprising an administration server that includes
a table for administrating information on the master storage unit and information on the replica storage units; and
a checking unit that acquires information on a replica storage unit which corresponds to a client terminal by referring to the table, and sends the information on the replica storage unit to the client terminal.

4. A method for a client terminal to access a storage unit of a storage device in a network boot system, the method comprising:
the network boot system including a plurality of client terminals and the network boot system comprises a plurality of storage units separated into a system area and a user area in storage devices for each user;
at least one storage device including a plurality of storage units, which includes a master storage unit; and
a network to connect the plurality of client terminals, and the storage device to each other, the method comprising:
creating, by the storage device, a plurality of replica storage units by copying the master storage unit,
loading, by the plurality of client terminals, data required for operation of the client terminal from the same one or different ones of the plurality of replica storage units, said system area storage unit includes the master storage unit and at least one of the replica storage units wherein when the master storage unit is updated and stored in the at least one storage device, the storage device copies the updated master storage unit to update the replica storage units, and the plurality of client terminals do not load the data required for operation from the master storage unit after the master storage unit is updated and stored in the at least one storage device so as to reduce a maintenance cost for storage units in a storage device by performing maintenance only to the master storage unit.

5. The method according to claim 4, wherein the master storage unit stores therein an operating system and an application program.

6. The method according to claim 4, wherein the network boot system further includes an administration server having a table for administrating information on the master storage unit and information on the replica storage units; and
   the loading includes receiving, from the administration server, information on the a replica storage unit which corresponds to a client terminal and is obtained by referring to the table, and loading the data required for operation based on the information on the replica storage unit.

* * * * *